US008525888B2

(12) United States Patent
Abe

(10) Patent No.: US 8,525,888 B2
(45) Date of Patent: Sep. 3, 2013

(54) ELECTRONIC CAMERA WITH IMAGE SENSOR AND RANGEFINDING UNIT

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 365 days.

(21) Appl. No.: 12/811,734

(22) PCT Filed: Jan. 15, 2009

(86) PCT No.: PCT/JP2009/050455
§ 371 (c)(1), (2), (4) Date: Jul. 6, 2010

(87) PCT Pub. No.: WO2009/090992
PCT Pub. Date: Jul. 23, 2009

(65) Prior Publication Data

US 2010/0277609 A1 Nov. 4, 2010

(30) Foreign Application Priority Data

Jan. 17, 2008 (JP) ................................ 2008-007768
Jan. 17, 2008 (JP) ................................ 2008-007769

(51) Int. Cl.

| | |
|---|---|
| ***H04N 5/228*** | (2006.01) |
| ***H04N 5/235*** | (2006.01) |
| ***G06K 9/62*** | (2006.01) |
| ***G03B 3/00*** | (2006.01) |
| ***G03B 13/00*** | (2006.01) |

(52) U.S. Cl.
USPC ................ 348/208.16; 348/222.1; 348/231.6; 382/234; 396/137

(58) Field of Classification Search
USPC .................. 348/208.16, 222.1, 229.1, 230.1, 348/231.6; 382/165, 209, 224, 225, 228; 396/137, 238, 242
See application file for complete search history.

(56) References Cited

U.S. PATENT DOCUMENTS

| | | | | |
|---|---|---|---|---|
| 5,159,646 | A | 10/1992 | Kumagai | |
| 5,754,226 | A | 5/1998 | Yamada et al. | |
| 5,915,133 | A * | 6/1999 | Hirai et al. | 396/48 |
| 6,301,440 | B1 * | 10/2001 | Bolle et al. | 396/128 |
| 7,822,327 | B2 * | 10/2010 | Chien et al. | 396/48 |

(Continued)

FOREIGN PATENT DOCUMENTS

| | | |
|---|---|---|
| JP | A-3-179879 | 8/1991 |
| JP | A 03-223976 | 10/1991 |

(Continued)

OTHER PUBLICATIONS

International Search Report issued in corresponding International Application No. PCT/JP2009/050455, mailed Feb. 24, 2009. (with English-language translation).

(Continued)

*Primary Examiner* — John Villecco
(74) *Attorney, Agent, or Firm* — Oliff & Berridge, PLC.

(57) ABSTRACT

An electronic camera, includes an image sensor, a rangefinding means, an arithmetic operation means for calculating a characteristic quantities based upon at least either pixel density in an image obtained via the image sensor or rangefinding information obtained via the rangefinding means, a judgment means for judging a photographic scene based upon characteristic quantities calculated by the arithmetic operation means, and a control means for selecting camera settings in correspondence to the photographic scene having been judged.

17 Claims, 13 Drawing Sheets

(56) References Cited

U.S. PATENT DOCUMENTS

| | | | | |
|---|---|---|---|---|
| 7,872,670 | B2 * | 1/2011 | Kikuchi | 348/208.16 |
| 8,013,902 | B2 * | 9/2011 | Ozaki | 348/222.1 |
| 8,081,238 | B2 * | 12/2011 | Ono | 348/234 |
| 8,199,203 | B2 * | 6/2012 | Sugimoto | 348/208.14 |
| 8,248,484 | B2 * | 8/2012 | Sugimoto | 348/222.1 |
| 2002/0018142 | A1 | 2/2002 | Oda | |
| 2002/0097441 | A1 * | 7/2002 | Hara et al. | 358/302 |
| 2003/0007076 | A1 | 1/2003 | Okisu et al. | |
| 2003/0026607 | A1 * | 2/2003 | Okisu et al. | 396/213 |
| 2003/0123111 | A1 | 7/2003 | Minakuti | |
| 2004/0041920 | A1 * | 3/2004 | Mizukami et al. | 348/222.1 |
| 2004/0239963 | A1 | 12/2004 | Terashita | |
| 2005/0031330 | A1 | 2/2005 | Nonaka et al. | |
| 2005/0069278 | A1 | 3/2005 | Akahori | |
| 2005/0093989 | A1 * | 5/2005 | Imai | 348/222.1 |
| 2005/0185084 | A1 | 8/2005 | Nonaka et al. | |
| 2007/0025722 | A1 | 2/2007 | Matsugu et al. | |
| 2007/0096024 | A1 * | 5/2007 | Furuya et al. | 250/332 |
| 2007/0153111 | A1 * | 7/2007 | Kato | 348/333.11 |
| 2008/0037975 | A1 * | 2/2008 | Nakajima | 396/104 |
| 2009/0160968 | A1 * | 6/2009 | Prentice et al. | 348/223.1 |
| 2010/0079589 | A1 * | 4/2010 | Yoshida et al. | 348/81 |
| 2010/0123815 | A1 * | 5/2010 | Yim et al. | 348/333.02 |
| 2010/0194931 | A1 * | 8/2010 | Kawaguchi et al. | 348/240.99 |
| 2011/0007177 | A1 * | 1/2011 | Kang | 348/222.1 |
| 2011/0090368 | A1 * | 4/2011 | Iwamoto et al. | 348/231.99 |
| 2011/0317026 | A1 * | 12/2011 | Shibazaki | 348/222.1 |
| 2012/0281107 | A1 * | 11/2012 | Sugimoto | 348/222.1 |

FOREIGN PATENT DOCUMENTS

| | | |
|---|---|---|
| JP | A-05-183801 | 7/1993 |
| JP | A 06-259522 | 9/1994 |
| JP | A 08-172568 | 7/1996 |
| JP | A 11-134344 | 5/1999 |
| JP | A-11-344450 | 12/1999 |
| JP | A 2001-358988 | 12/2001 |
| JP | A 2003-008986 | 1/2003 |
| JP | A-2003-18453 | 1/2003 |
| JP | A-2003-46858 | 2/2003 |
| JP | A 2003-189211 | 7/2003 |
| JP | A 2003-348339 | 12/2003 |
| JP | A 2004-157456 | 6/2004 |
| JP | A 2005-122720 | 5/2005 |
| JP | A-2005-235041 | 9/2005 |
| JP | A 2006-086758 | 3/2006 |
| JP | A-2006-203566 | 8/2006 |
| JP | A-2006-259899 | 9/2006 |
| JP | A 2007-088644 | 4/2007 |
| JP | A-2007-251694 | 9/2007 |
| JP | A 2007-306461 | 11/2007 |
| JP | A 2007-311895 | 11/2007 |
| JP | A-2007-329619 | 12/2007 |

OTHER PUBLICATIONS

Jun. 26, 2012 Office Action issued in Japanese Patent Application No. 2008-007769 (with translation).

Japanese Office Action issued in Japanese Patent Application No. 2008-007769 on Jan. 31, 2012 (with translation).

Japanese Office Action issued in Japanese Patent Application No. 2008-007768 on Jan. 31, 2012 (with translation).

Sakaida et al., "An image segmentation method by the region integration using the initial dependence of the clustering algorithm," Nov. 15, 1998, pp. 42-56, No. 53, NHK Science and Technical Research Laboratories, Japan (with Abstract).

Oct. 4, 2011 Office Action issued in Japanese Patent Application No. 2008-007768 (with translation).

Sep. 27, 2011 Office Action issued in Japanese Patent Application No. 2008-007769 (with translation).

* cited by examiner

FIG.3

| | Bh | Std | B | Y | U | M | L |
|---|---|---|---|---|---|---|---|
| SAMPLE 1 : | 0.303 | 0.587 | 0.544 | 0.557 | 0.52 | 0.2 | 0.13 |
| SAMPLE 2 : | 0.139 | 0.0639 | 0.685 | 0.541 | 1.51 | 1.61 | 1.54 |
| SAMPLE 3 : | 0.328 | 0.566 | 0.728 | 0.556 | 1.48 | 0.49 | 0.1 |
| SAMPLE 4 : | 0.0664 | 0.158 | 0.266 | 0.201 | 0.46 | 0.43 | 0.44 |
| SAMPLE 5 : | 0.609 | 0.0855 | 0.723 | 0.527 | 1.38 | 1.2 | 1.34 |
| SAMPLE 6 : | 0.180 | 0.393 | 0.935 | 0.795 | 0.62 | 0.12 | 0.14 |
| SAMPLE 7 : | 0.669 | 0.169 | 0.544 | 0.229 | 1.62 | 1.6 | 1.58 |
| SAMPLE 8 : | 0.0951 | 0.510 | 0.670 | 0.395 | 1.42 | 1.53 | 1.49 |
| SAMPLE 9 : | 0.0778 | 0.147 | 0.510 | 0.546 | 0.47 | 0.52 | 0.54 |
| SAMPLE 10 : | 0.122 | 0.548 | 0.538 | 0.657 | 0.54 | 0.53 | 0.49 |
| SAMPLE 11 : | 0.191 | 0.120 | 0.417 | 0.351 | 0.08 | 0.09 | 0.11 |
| SAMPLE 12 : | 0.0781 | 0.164 | 0.223 | 0.355 | 0.15 | 0.12 | 0.08 |
| | . . | . . | . . | . . | . | . . | . . |

FIG.4

| | FIRST PRINCIPAL COMPONENT | SECOND PRINCIPAL COMPONENT | | | | | |
|---|---|---|---|---|---|---|---|
| Bh | 0.1761 | 0.0413 | -0.2358 | -0.9212 | 0.1438 | -0.2047 | 0.0227 |
| std | -0.0188 | -0.3751 | -0.8971 | 0.1872 | 0.0451 | 0.1306 | -0.0055 |
| B | 0.1288 | -0.6190 | 0.3042 | -0.2307 | -0.0159 | 0.6701 | 0.0721 |
| Y | 0.0210 | -0.6839 | 0.1994 | 0.0742 | -0.0108 | -0.6959 | -0.0468 |
| U | 0.5946 | 0.0503 | 0.0428 | 0.2275 | 0.6935 | -0.0279 | 0.3294 |
| M | 0.6010 | 0.0428 | -0.0153 | 0.0676 | -0.1697 | 0.0338 | -0.7760 |
| L | 0.4866 | 0.0496 | -0.0719 | 0.0369 | -0.6835 | -0.0758 | 0.5304 |

(a)

(b)

(c)

(d)

ELECTRONIC CAMERA WITH IMAGE SENSOR AND RANGEFINDING UNIT

TECHNICAL FIELD

The present invention relates to an electronic camera

BACKGROUND ART

There are technologies known in the related art, which are adopted when classifying and labeling images (see, for instance, patent reference 1)

Patent Reference 1: Japanese Laid-open Publication No. H11-134344

SUMMARY OF THE INVENTION

Problem to be Solved by the Invention

With the technologies in the related art, it has been unable to classify the photographic scenes prior to the photographing operation.

Means for Solving the Problem (1) According to the 1st aspect of the invention, an electronic camera, comprises: an image sensor; a rangefinding means; an arithmetic operation means for calculating a characteristic quantities based upon at least either pixel density in an image obtained via the image sensor or rangefinding information obtained via the rangefinding means; a judgment means for judging a photographic scene based upon characteristic quantities calculated by the arithmetic operation means; and a control means for selecting camera settings in correspondence to the photographic scene having been judged.

(2) According to the 2nd aspect of the invention, in the electronic camera, comprises: an image sensor; rangefinding means; a first arithmetic operation means for calculating a characteristic quantities based upon pixel density in an image obtained via the image sensor and rangefinding information obtained via the rangefinding means; a second arithmetic operation means for selecting a characteristic quantity group with characteristic quantities closest to the characteristic quantities calculated by the first arithmetic operation means, among a plurality of characteristic quantity groups classified in advance in a space in which the characteristic quantities are expressed; a third arithmetic operation means for judging a photographic scene corresponding to the characteristic quantity group selected by the second arithmetic operation means; and a control means for selecting camera settings in correspondence to the photographic scene having been judged.

(3) According to the 3rd aspect of the invention, in the electronic camera according to the 2nd aspect, it is preferred that the electronic camera further comprises: a storage means for storing mean value information indicating a mean value of characteristic quantities in each of the characteristic quantity groups having been classified, wherein: the second arithmetic means selects a characteristic quantity group corresponding to the mean value information indicating a value closest to a characteristic quantity calculated within the space by the first arithmetic operation means.

(4) According to the 4th aspect of the invention, in the electronic camera according to the 3rd aspect, it is preferred that characteristic quantities calculated for a plurality of sample images based upon pixel densities in the plurality of sample images and rangefinding information obtained while photographing the plurality of sample images are classified in advance in a space in which the characteristic quantities are expressed and the mean value information corresponding to each categorized characteristic quantity group is stored in the storage means.

(5) According to the 5th aspect of the invention, in the electronic camera according to the 2nd aspect, it is preferred that the electric camera further comprises: a storage means for storing characteristic quantity variance/covariance information for each of the classified characteristic quantity groups, wherein: the second arithmetic operation means selects a characteristic quantity group corresponding to the variance/covariance information indicating a value closest to a characteristic quantity calculated within the space by the first arithmetic operation means.

(6) According to the 6th aspect of the invention, in the electronic camera according to the 5th aspect, it is preferred that characteristic quantities for a plurality of sample images which are calculated based upon pixel densities of the plurality of sample images and rangefinding information obtained while photographing the plurality of sample images are classified in advance in a space in which the characteristic quantities are expressed, and the variance/covariance information corresponding to each classified characteristic quantity group is stored in the storage means.

(7) According to the 7th aspect of the invention, in the electronic camera according to the 2nd aspect, it is preferred that the first arithmetic operation means calculates a plurality of (N) characteristic quantities based upon pixel density of images obtained via the image sensor and rangefinding informations obtained via the rangefinding means; the electronic camera further comprises a fourth arithmetic operation means for executing characteristic quantity space conversion from a space in which the N characteristic quantities are expressed to a space in which the characteristic quantities of number less than N are expressed; and the second arithmetic operation means selects a characteristic quantity group with characteristic quantities closest to a characteristic quantities resulting from conversion executed by the fourth arithmetic operation means among a plurality of characteristic quantity groups classified in advance in the space resulting from the characteristic quantity space conversion.

(8) According to the 8th aspect of the invention, in the electronic camera according to the 7th aspect, it is preferred that the electric camera further comprises: a storage means for storing mean value information indicating a mean value of characteristic quantities in the characteristic quantity group having been classified, wherein: the second arithmetic means selects a characteristic quantity group corresponding to the mean value information indicating a value closest to a characteristic quantity calculated by the fourth arithmetic operation means within the space resulting from the characteristic quantity space conversion.

(9) According to the 9th aspect of the invention, in the electronic camera according to the 8th aspect, it is preferred that characteristic quantities for a plurality of sample images which are calculated based upon pixel densities in the plurality of sample images and rangefinding information obtained while photographing the plurality of sample images are classified in advance in a space resulting from the characteristic quantity space conversion in which the characteristic quantities are expressed and mean value information corresponding to each categorized characteristic quantity group is stored in the storage means.

(10) According to the 10th aspect of the invention, in the electronic camera according to the 7th aspect, it is preferred that the electronic camera further comprises: a storage means for storing characteristic quantity variance/covariance information for each of the classified characteristic quantity groups, wherein: the second arithmetic operation means selects a characteristic quantity group corresponding to the variance/covariance information indicating a value closest to a characteristic quantity calculated by the fourth arithmetic operation means within the space resulting from the characteristic quantity space conversion.

(11) According to the 11th aspect of the invention, in the electronic camera according to the 10th aspect, it is preferred that characteristic quantities for a plurality of sample images which is calculated based upon pixel densities in the plurality of sample images and rangefinding information obtained while photographing the plurality of sample images are classified in advance in the space resulting from the characteristic quantity space conversion in which the characteristic quantities are expressed, and a variance/covariance information corresponding to each of the classified characteristic quantity group is stored in the storage means.

(12) According to the 12th aspect of the invention, in the electronic camera according to any one of aspects 2 through 11, it is preferred that the first arithmetic operation means calculates characteristic quantities based upon pixel density in an image obtained via the image sensor before a photographing instruction is issued and a rangefinding information obtained via the rangefinding means before the photographing instruction is issued.

(13) According to the 13th aspect of the invention, in the electronic camera according to the 1st aspect, it is preferred that the arithmetic operation means calculates a characteristic quantity based upon pixel density over an entire image.

(14) According to the 14th aspect of the invention, in the electronic camera according to the 1st aspect, it is preferred that the arithmetic operation means calculates a plurality of characteristic quantities each based upon pixel density in one of various areas into which an image is divided.

(15) According to the 15th aspect of the invention, in the electronic camera according to the 1st aspect, it is preferred that the arithmetic operation means calculates a characteristic quantity based upon an extent of change in pixel density over an entire image.

(16) According to the 16th aspect of the invention, in the electronic camera according to the 1st aspect, it is preferred that the arithmetic operation means calculates a characteristic quantity based upon an extent of change in pixel density in a specific area of an image.

(17) According to the 17th aspect of the invention, in the electronic camera according to the 1st aspect, it is preferred that the arithmetic operation means calculates a characteristic quantity based upon rangefinding information corresponding to a subject.

(18) According to the 18th aspect of the invention, in the electronic camera according to the 1st aspect, it is preferred that the arithmetic operation means calculates a characteristic quantity based upon an extent of change in a rangefinding information for the an entire image.

(19) According to the 19th aspect of the invention, in the electronic camera according to the 1st aspect, it is preferred that the arithmetic operation means calculates a characteristic quantity based upon an extent of change in a rangefinding information in a specific area of an image.

(20) According to the 20th aspect of the invention, an electronic camera, comprises: an image sensor; a rangefinding means; an arithmetic operation means for individually calculating characteristic quantities based upon at least two of; pixel density in an image obtained via the image sensor, an extent of change in pixel density corresponding to a main subject, rangefinding information for a main subject obtained via the rangefinding means, rangefinding information for a background obtained via the rangefinding means, and an extent of change in a rangefinding information for the main subject; a judging means for judging a photographic scene in correspondence to characteristic quantities calculated by the arithmetic operation means; and a control means for arranging camera settings in correspondence to the photographic scene having been judged.

(21) According to the 21st aspect of the invention, in the electronic camera according to any one of aspects 1 and 13 through 20, it is preferred that the arithmetic operation means calculates characteristic quantities based upon pixel density in an image obtained via the image sensor before a photographing instruction is issued and a rangefinding information obtained via the rangefinding means before the photographing instruction is issued.

Advantageous Effect of the Invention

The electronic camera according to the present invention allows a camera setting in correspondence to the photographic scene that is judged prior to the photographing operation.

BRIEF DESCRIPTION OF THE DRAWINGS

FIG. 3 shows examples of characteristic quantities FIG. 4 is a chart presenting examples of the first principal component information through the seventh principal component information

BEST MODE FOR CARRYING OUT THE INVENTION

The following is a description of the best mode for carrying out the present invention.

First Embodiment

Figure 1:
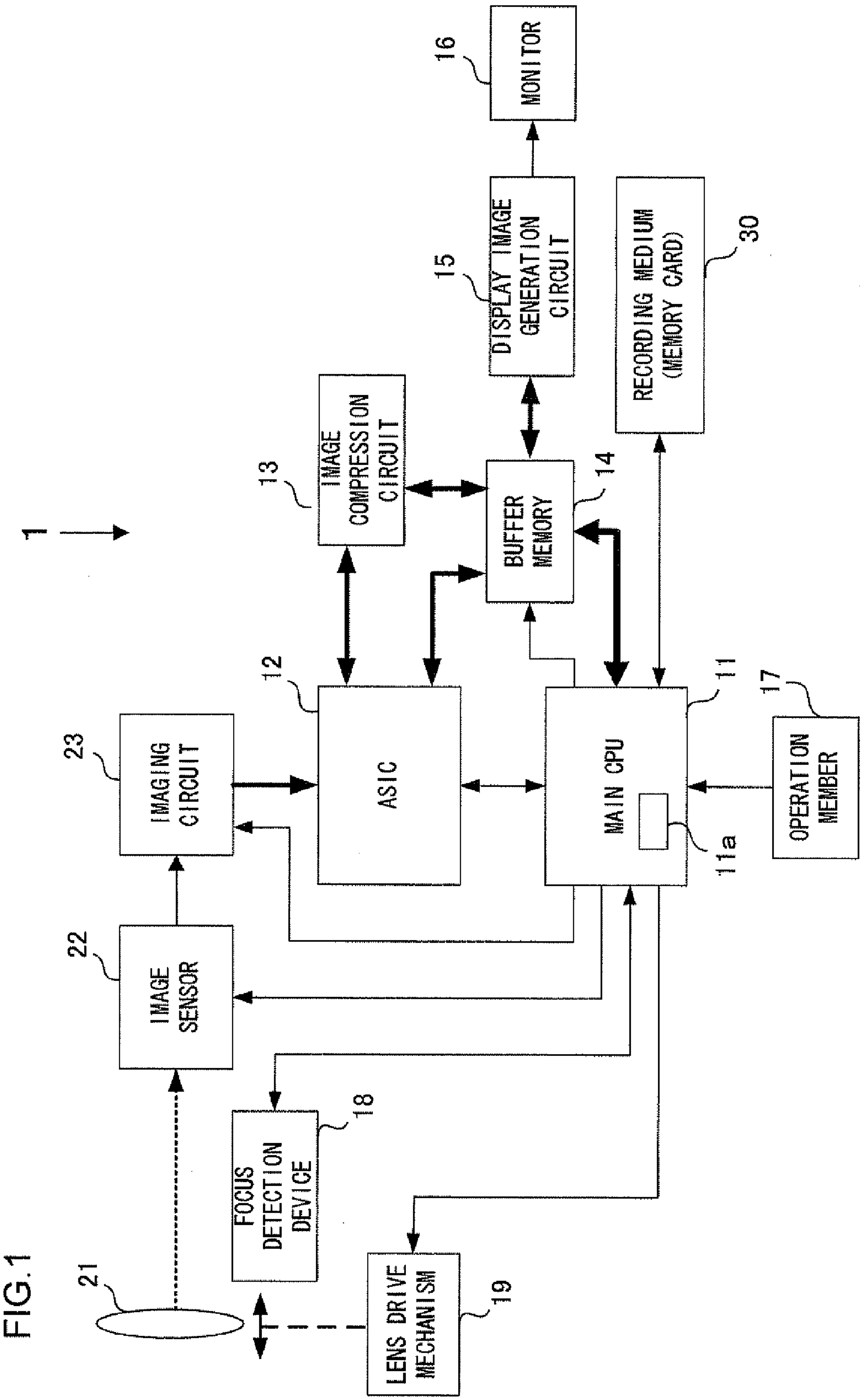
FIG. 1 is a block diagram showing the essential components of the electronic camera according to the first embodiment of the present invention

FIG. 1 is a block diagram showing the configuration of major parts of an electronic camera 1 according to the first embodiment of the present invention. The electronic camera 1 is controlled by a main CPU 11.

A subject image is formed through a photographic lens 21 onto an imaging surface of an image sensor 22. The image sensor 22, which may be constituted with a CCD image sensor or the like, outputs image signals obtained by capturing the subject image formed on the imaging plane, to an imaging circuit 23. At the imaging surface of the image sensor 22, R (red), G (green) and B (blue) color filters are disposed, each in correspondence to a specific pixel position. Since the subject image is captured through the color filters at the image sensor 22, photoelectric conversion signals output from the image sensor 22 contain color information expressed in the RGB colorimetric system.

The imaging circuit 23 executes analog processing (such as gain control) on the photoelectric conversion signals output from the image sensor 22 and also converts the analog imaging signals to digital data with a built-in A/D conversion circuit.

The main CPU 11 executes predetermined arithmetic operations on the signals input thereto from various blocks and outputs control signals, generated based upon the arithmetic operation results, to the individual blocks. An image processing circuit 12, which may be constructed, for instance, as an ASIC, executes image processing on the digital image signals input thereto from the imaging circuit 23. The image processing executed with the image processing circuit includes, for instance, edge enhancement, color temperature adjustment (white balance adjustment) processing and format conversion processing executed on the image signals.

An image compression circuit 13 executes image compression processing so as to compress the image signals having undergone the processing at the image processing circuit 12 into the PEG format at a predetermined compression rate. A display image generation circuit 15 generates display data to be used for displaying the captured image at a liquid crystal monitor 16.

A recording medium 30 is constituted with a memory card or the like that can be detachably loaded into the electronic camera 1. In response to an instruction issued by the main CPU 11, an image file containing data expressing a photographic image and information on the photographic image is recorded into the recording medium 30. The image file having been recorded into the recording medium 30 can be read out in response to an instruction from the main CPU 11.

A buffer memory 14, where data yet to undergo the image processing, data having undergone the image processing and data currently undergoing the image processing are temporarily stored, is also used to store an image file yet to be recorded into the recording medium 30 or an image file having been read out from the recording medium 30.

An operation member 17, which includes various buttons and switches at the electronic camera 1, outputs an operation signal corresponding to operational details of an operation performed at a specific button or switch constituting the operation member, such as a shutter release button depression or a switching operation at a mode selector switch, to the main CPU 11.

A focus detection device 18 detects the focusing condition achieved via the photographic lens 21 through a phase difference detection method of the known art by using a light flux corresponding to a specific focus detection area. In more specific terms, a pair of subject images are formed on an auto focus sensor (not shown) via a focus detection optical system (not shown). The main CPU 11 detects the state of the focusing position adjustment (a defocus quantity) achieved via the photographic lens 21 based upon the relative distance between the pair of subject images formed on the sensor.

A lens drive mechanism 19 drives a focus lens (not shown) constituting the photographic lens 21 back and forth along the optical axis in response to an instruction issued by the main CPU 11. As the focus lens is thus driven, focused adjustment is executed.

The electronic camera 1 adopts a structure that allows an operation through which a live image is obtained and the live image is then brought up on display at the liquid crystal monitor 16, to be repeatedly executed until the shutter release button is pressed all the way down. The term "live image" is used to refer to a monitor image obtained before a photographing instruction (a main image acquisition instruction) is issued.

The electronic camera 1 executes automatic exposure calculation (AE) by using live image signals and determines a shutter speed and an aperture setting that will achieve the optimal exposure. For instance, brightness (luminance) information indicating the brightness of the subject may be detected through an averaged photometering method. In such a case, the value obtained by calculating a mean value of the values indicated by the signals output from the pixels constituting the live image is used as the subject brightness information. Based upon the subject brightness information, the electronic camera 1 determines the optimal shutter speed and aperture number.

When obtaining the next frame live image, the electronic camera 1 controls the length of time over which electric charges are to be stored at the image sensor 22 and the aperture number, based upon the brightness information calculated by using the signal values indicated by the signals expressing the live image in the preceding frame.

The electronic camera 1 in the embodiment has a function of judging the photographic scene by analyzing the live image. Upon judging the photographic scene, the electronic camera 1 is able to automatically select camera settings optimal for photographing the scene having been judged. Such camera settings include the exposure sensitivity, the white balance adjustment coefficient and a flash unit setting to allow/disallow light emission. The exposure sensitivity (ISO sensitivity) is set as an amplification gain via the imaging circuit 23. The white balance adjustment coefficient is set at the image processing circuit 12.

The photographic scene judged by the electronic camera 1 may be any one of the following six types of scenes; "portrait", "landscape", "night scene", "sports", "flowers in close-up" and "mountain landscape".

(Data Required for Photographic Scene Judgment)

The data that are used when judging the photographic scene are now described. Data used for judging the photographic scene are stored in a non-volatile memory area **11*a* within the main CPU 11**. These data are obtained in advance through calculation executed by using a plurality of sets of sample image data corresponding to the six different types of photographic scenes. The following is a description of the procedure through which such data are generated.

(Characteristic Quantity Calculation)

Figure 2:
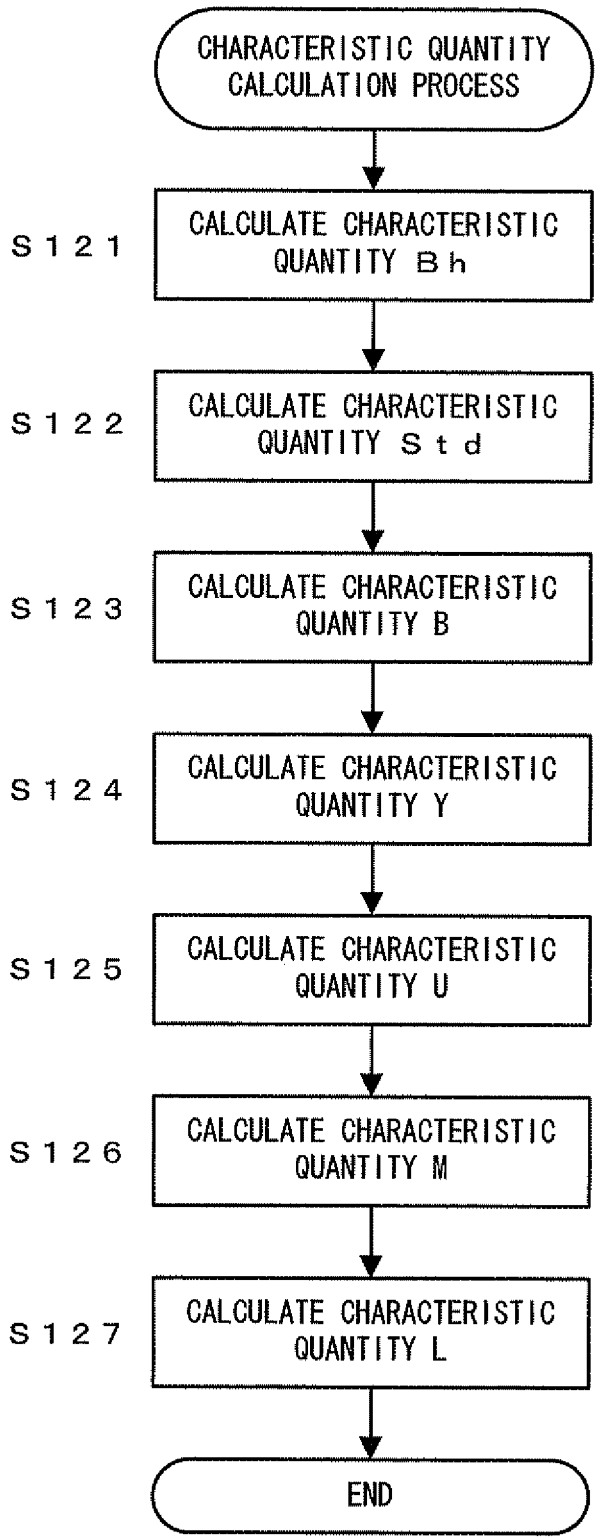
FIG. 2 is a flowchart of characteristic quantity calculation processing

Seven characteristic quantities are calculated based upon each set of sample image data corresponding to a specific type of photographic scene. FIG. 2 presents a flowchart of the characteristic quantity calculation process. In step S121 in FIG. 2, a characteristic quantity Bh is calculated.

The characteristic quantity 1 (=Bh) is a value obtained by dividing the mean value of the B (blue) component pixel data density values (e.g., values within the range of 0~255 in the case of 8-bit gradation data), indicating the concentration of B (blue) component pixel data present in an upper portion (e.g., the uppermost area among three areas formed by dividing the image along the vertical direction into three substantially equal portions) by the mean value of the B (blue) component pixel data density values indicating the densities of the B (blue) component pixel data present in a lower portion of the image (e.g., the lowermost area among the three substantially equal areas into which the image is divided along the vertical direction).

In step S122, a characteristic quantity Std is calculated. The characteristic quantity 2 (=Std) is a standard deviation value indicating the extent of variation manifested by the density values corresponding to the pixel data in the entire image. In step S123, a characteristic quantity B is calculated. The characteristic quantity 3 (=B) is the mean value of the B (blue) component pixel data density values corresponding to the B (blue) component pixel data contained in the entire image.

In step S124, a characteristic quantity Y is calculated. The characteristic quantity 4 (=Y) is the mean value of the values indicated in brightness information calculated as expressed in (1) below. Namely, the average of the Y component density values in the pixel data corresponding to all the pixels constituting the image is calculated.

$$Y=0.299\times R+0.587\times 0.114\times B \quad (1)$$

In step S125, a characteristic quantity U is calculated. The characteristic quantity U) is constituted with subject distance information indicating the distance of a subject present in an upper portion of the image (e.g., the uppermost area among the three substantially equal areas into which the image is divided along the vertical direction). More specifically, if the focus area selected for focusing purposes is present in an area substantially equivalent to the top third of the image, the distance information represented by the defocus quantity having been calculated for the particular focus area is designated as the distance information U for the upper portion of the image. If, on the other hand, the focus area selected for focusing is not present in the area substantially equivalent to the top third of the image, the distance information average obtained by calculating a mean value of the defocus quantities calculated in correspondence to a plurality of focus areas present in the area is designated as the distance information U for the upper portion of the image.

The infinite (∞) distance that the distance information may indicate changes in correspondence to the lens in use. For instance, when a lens with a focal length of 200 mm is used, the distance information corresponding to a subject located over a distance of 20 m or more will invariably indicate ∞, whereas when a lens with a focal length of 50 mm is used, the distance information corresponding to a subject located over a distance of 5 m or more will invariably indicate ∞. Accordingly, the measured distance is normalized through logarithmic compression. For instance, a distance of 20 m is adjusted to a normalized value of 1.3 and a distance of 5 m is normalized to a value of 0.7 by using a common logarithm with a base of 10, and as a result, the ratio of the infinite (∞) distances corresponding to the 200 mm lens and 50 mm lens, initially taking on a value of 4, is compressed to a value equal to or less than 2.

In step S126, a characteristic quantity M is calculated. The characteristic quantity 6 (=M) is constituted with subject distance information indicating the distance of a subject present in a middle portion of the image (e.g., the middle area among the three substantially equal areas into which the image is divided along the vertical direction). More specifically, if the focus area selected for focusing purposes is present in an area substantially equivalent to the middle third of the image, the distance information represented by the defocus quantity having been calculated for the particular focus area is designated as the distance information M for the middle portion of the image. If, on the other hand, the focus area selected for focusing is not present in the area substantially equivalent to the middle third of the image, the distance information average obtained by calculating a mean value of the defocus quantities calculated in correspondence to a plurality of focus areas present in the area is designated as the distance information M for the middle portion of the image.

In step S127, a characteristic quantity L is calculated. The characteristic quantity 7 (=L) is constituted with subject distance information indicating the distance of a subject present in a lower portion of the image (e.g., the lowermost area among the three substantially equal areas into which the image is divided along the vertical direction). More specifically, if the focus area selected for focusing purposes is present in an area substantially equivalent to the bottom third of the image, the distance information represented by the defocus quantity having been calculated for the particular focus area is designated as the distance information L for the lower portion of the image. If, on the other hand, the focus area selected for focusing is not present in the area substantially equivalent to the bottom third of the image, the distance information average obtained by calculating a mean value of the defocus quantities calculated in correspondence to a plurality of focus areas present in the area is designated as the distance information L for the lower portion of the image.

Through the characteristic quantity calculation process executed as described above, seven types of characteristic quantities are calculated for a given image. FIG. 3 presents examples of characteristic quantities that may be calculated for the individual sample images.

(Characteristic Quantity Evaluation Based Upon Statistical Values)

First principal component information, second principal component information, . . . and seventh principal component information is obtained all in correspondence to each type of characteristic quantity by executing statistical principal component analysis of a characteristic quantity group, an example of which is presented in FIG. 3. FIG. 4 presents examples of the first principal component information through the seventh principal component information. It is to be noted that the vector indicated by each principal component in FIG. 4 is referred to as a proper vector (pcs).

(Characteristic Quantity Space Conversion)

The term "characteristic quantity space conversion" used in the description of the embodiment refers to conversion of data in the seven-dimensional characteristic quantity space defined with the seven characteristic quantity axes described above to data in another characteristic quantity space of different dimensions, defined by the principal component axes obtained through the principal component analysis. In the embodiment, the first principal component axis and the second principal component axis among the first principal component axis through the seventh principal component axis obtained through the principal component analysis are used and the data are converted to those in a two dimensional characteristic quantity space defined by these two principal component axes. The first principal component may be considered to be a characteristic quantity representing the "subject distance and sky". The second principal component may be considered to be a characteristic quantity indicating the "color tone, brightness, contrast".

The characteristic quantity space conversion is executed for each set of sample image data by using the proper vectors explained earlier so as to convert the data in the initial characteristic quantity space to data in the new characteristic quantity space. More specifically, assuming that the seven characteristic quantities (Bh, Std, B, Y, U, M, L) for a given set of sample image data are (a1, a2, a3, a4, a5, a6, a7), the first principal component data in the new characteristic quantity space are calculated as; 0.1761×a1−0.0188×a2+0.1288×a3+0.0210×a4+0.5946×a5+0.6010×a6+0.4866×a7 for this particular set of sample image data. Likewise, the second principal component data in the new characteristic quantity space are calculated as; 0.0413×a1−0.03751×a2−0.06190×a3−0.6839×a4+0.0503×a5+0.0428×a6+0.0496×a7.

(Clustering)

Figure 5:
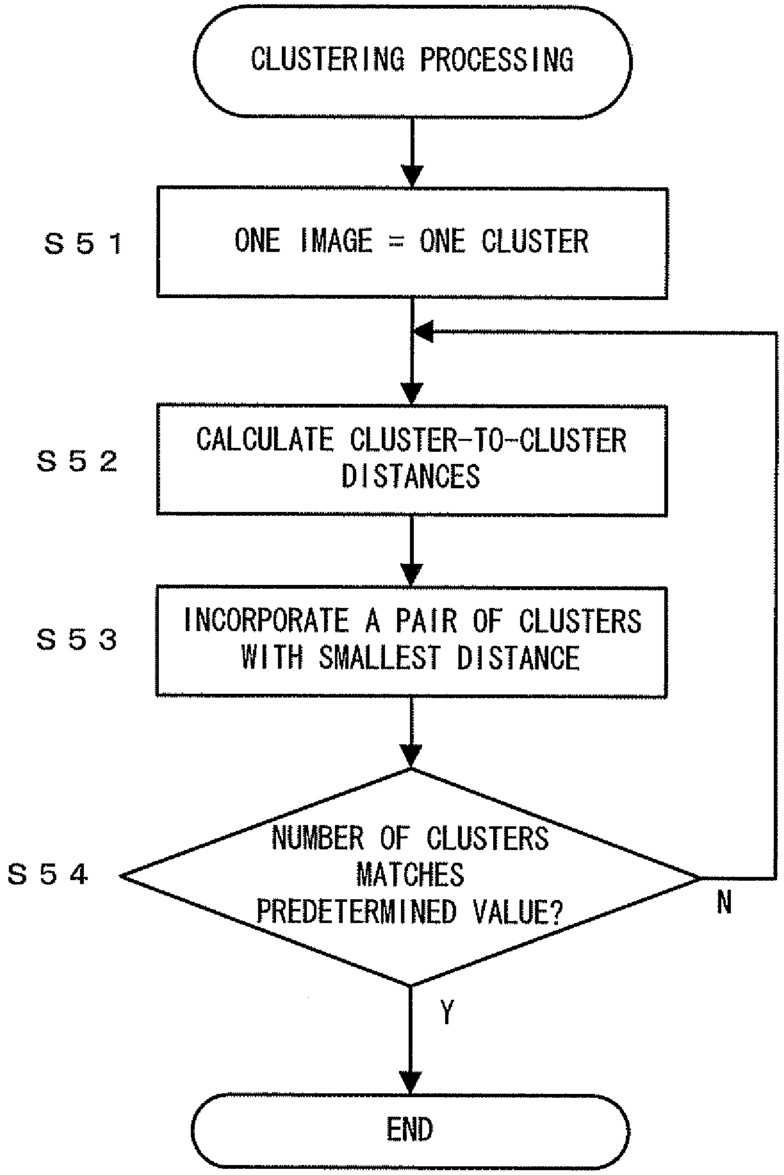
FIG. 5 is a flowchart of clustering processing

The sample images are then clustered in the new characteristic quantity space. In reference to the flowchart presented in FIG. 5, the flow of the clustering processing is now described. In step S51, each image (i.e., a single set of data in the new characteristic quantity space) is designated as one cluster. In step S52, a distance d (R, Q) between the clusters is calculated with the equation (2) below, which is used to calculate the group-to-group mean value, before the operation proceeds to step S53.

[Expression 1]

$$d(R, Q) = \frac{1}{|R||Q|} \sum_{\substack{i \in R \\ j \in Q}} d(i, j) \qquad (2)$$

| | indicates the number of elements

It is to be noted that R and Q each represent a cluster.

In step S53, the pair of clusters with the smallest distance among the distances calculated for the various pairs of clusters are incorporated as a single cluster. Through this processing, the overall number of clusters is reduced. In step S54, a decision is made as to whether or not the number of clusters is equal to a predetermined value. An affirmative decision is made in step S54 if the number of clusters has been reduced to match the predetermined value and in such a case, the processing in FIG. 5 ends. However, a negative decision is made in step S54 if the number of clusters has not been reduced to match the predetermined value and in this case, the operation returns to step S52. The clustering processing is continuously executed after the operation returns to step S52.

Figure 6:
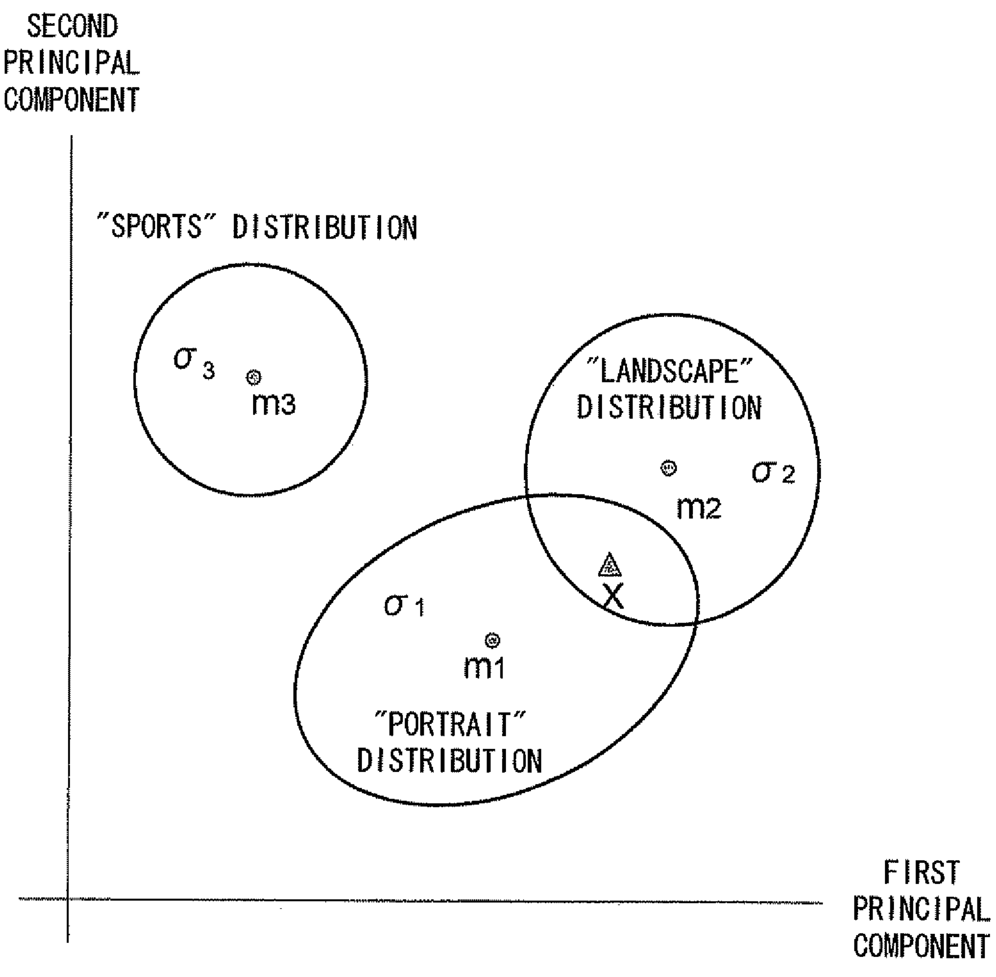
FIG. 6 is an example of data distribution after the clustering processing

The predetermined value may be set to, for instance, 6 and the clustering processing may be continuously executed until the number of clusters is reduced accordingly to 6 in the embodiment. Through such clustering processing, the sample images are classified into six groups. The six groups correspond to the six different photographic scenes, i.e., “portrait”, “landscape”, “night scene”, “sports”, “flowers in close-up” and “mountain landscape”. FIG. 6 presents an example of a data distribution that may be observed following the clustering processing. The example in the figure indicates data classified in correspondence to three specific types of photographic scenes, i.e., “sports”, “landscape” and “portrait”. Images corresponding to the data present within a given cluster are very similar to one another.

(Covariance Inverse Matrix Calculation)

A variance/covariance inverse matrix is then calculated for each of the distributions corresponding to “portrait”, “landscape”, “night scene”, “sports”, “flowers in close-up” and “mountain landscape”. For instance, the covariance inverse matrix (Inv1) for “landscape” is shown as in (3) below, as an example. In addition, the covariance inverse matrix (Inv2) for “portrait” is shown as in (4) below. The variance value corresponds to the widening expanse of the specific distribution shown in FIG. 6.

[Expression 2]

Covariance inverse matrix (*Inv*1) for “landscape”.

$$\begin{pmatrix} 0.218 & -0.0033 \\ -0.0033 & 0.1450 \end{pmatrix} \qquad (3)$$

[Expression 3]

Covariance inverse matrix (*Inv*2) for “portrait”.

$$\begin{pmatrix} 0.524 & -0.436 \\ -0.237 & 0.178 \end{pmatrix} \qquad (4)$$

(Characteristic Quantity Mean Value Calculation)

The characteristic quantity mean value is calculated for each of the distributions corresponding to “portrait”, “landscape”, “night scene”, “sports”, “flowers in close-up” and “mountain landscape”. For instance, the mean value (m1) may be calculated for “landscape”, as in (5) below. In addition, the mean value (m2) may be calculated for “portrait”, as in (6) below. The mean value is equivalent to the barycenter of each specific distribution in FIG. 6.

[Expression 4]

Landscape mean value $m1$ $$\begin{pmatrix} 0.123 & 0.344 \end{pmatrix} \qquad (5)$$

[Expression 5]

Portrait mean value $m2$ $$\begin{pmatrix} 0.362 & 0.547 \end{pmatrix} \qquad (6)$$

portrait mean value $m2$ (6)

The data to be used in the photographic scene judgment, having been generated as described above, i.e., the proper vectors (pcs), the covariance inverse matrices corresponding to the six distributions and the characteristic quantity mean values corresponding to the six distributions, are individually stored in the non-volatile memory area 11*a* within the main CPU 11. Since there are seven different types of characteristic quantities in the initial characteristic quantity space, there are four sets of data generated as the covariance inverse matrices in correspondence to each distribution, and there are two sets of data generated as the characteristic quantity mean values in correspondence to each distribution, a total of 7×2+(4×2)×6=50 sets of data are stored into the main CPU 11 in the embodiment. The proper vectors (pcs) account for 7×2=14 sets of data among these 50 sets of data. The proper vectors (pcs) may take on values such as those in (7) below.

[Expression 6]

Proper Vector (*pcs*)

$$\begin{pmatrix} 0.1761 \\ -0.0188 \\ 0.1288 \\ 0.0210 \\ 0.5946 \\ 0.6010 \\ 0.4866 \end{pmatrix} \begin{pmatrix} 0.0413 \\ -0.3751 \\ -0.6190 \\ -0.6839 \\ 0.0503 \\ 0.0428 \\ 0.0496 \end{pmatrix} \quad (7)$$

((Photographic Scene Judgment Process))

Figure 7:
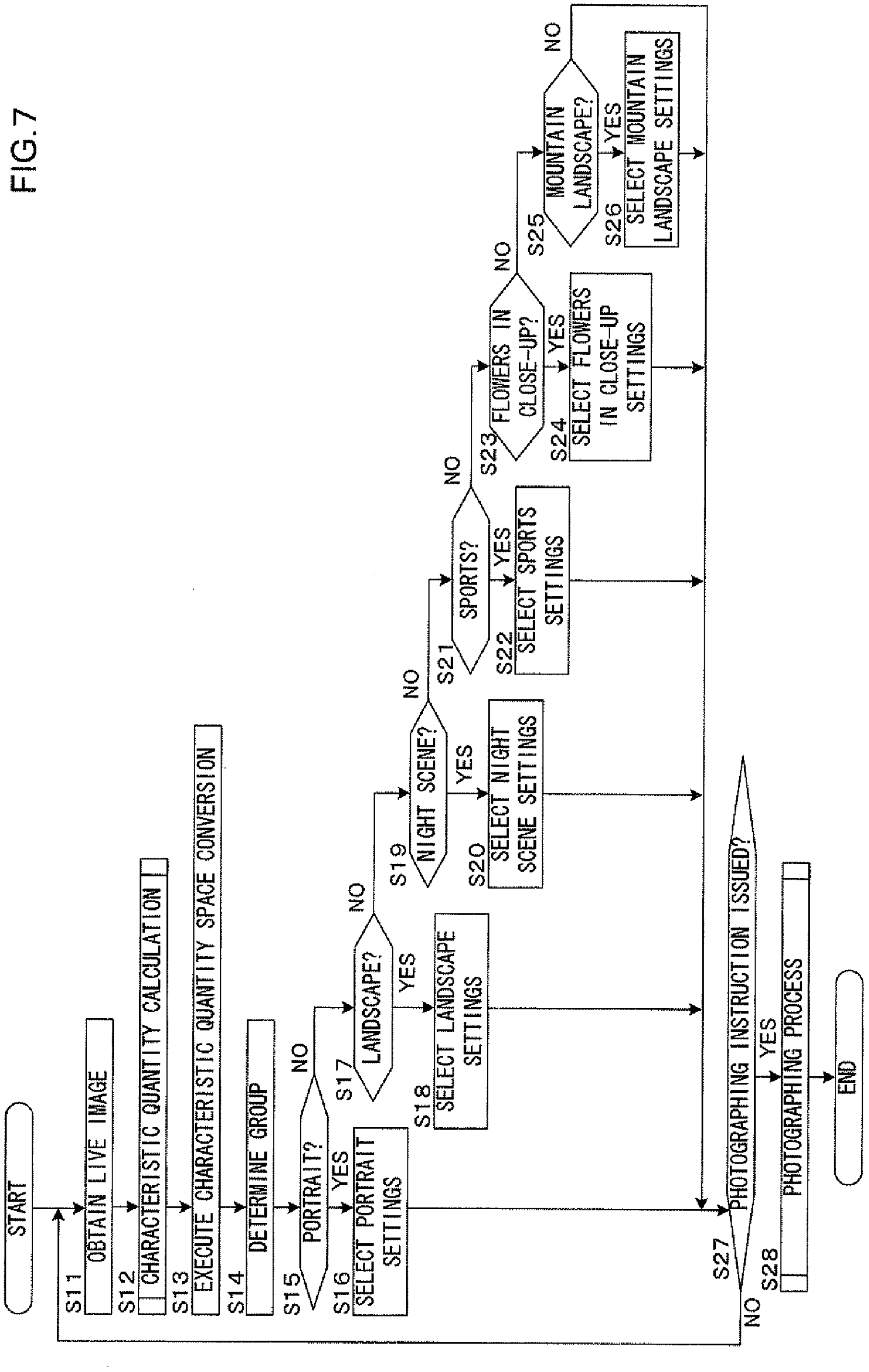
FIG. 7 is a flowchart of photographic scene judgment process

FIG. 7 presents a flowchart of the photographic scene judgment process executed by the main CPU 11 in the electronic camera 1. The program based upon which the processing in FIG. 7 is executed is started up as the electronic camera 1 is set in a photographing mode. In step S11 in FIG. 7, the main CPU 11 controls the drive of the image sensor 22 and the imaging circuit 23 so as to start acquisition of a live image and then the operation proceeds to step S12. In response, the image processing circuit 12 executes the image processing on the image signals expressing a live image, input thereto from the imaging circuit 23, and the display image generation circuit 15 brings the live image having undergone the image processing up on display at the liquid crystal monitor 16.

In step S12, the main CPU 11 calculates characteristic quantities by using the live image data expanded in the buffer memory 14 and then the operation proceeds to step S13. As in the characteristic quantity calculation executed for the sample image data as described above, the seven different types of characteristic quantities are calculated. However, the values indicated in the information having been obtained via the focus detection device 18 are used as the defocus quantities corresponding to the focused areas used in the calculation of the distance information U, the distance information M and the distance information L. The subject distance information is thus obtained for the live image. In step S13, the main CPU 11 executes characteristic quantity space conversion.

The characteristic quantity space conversion is executed as has been described earlier in reference to the sample image data. As a result, the live image data in the initial characteristic quantity space are converted to data in the new characteristic quantity space by using the proper vectors. In step S14, the main CPU 11 executes group (distribution) judgment, before the operation proceeds to step S15. In more specific terms, it looks for the distribution in the new characteristic quantity space, which are the closest to that of the live image. The main CPU 11 may select, for instance, the closest-range distribution based upon Euclidean distance. Assuming that x represents the live image data in FIG. 6, it calculates $|x-m1|$ and $|x-m2|$ and selects the distributions corresponding to the smaller value ("landscape"). In this case, the main CPU 11 judges that the live image data matches the photographic scene label "landscape".

In step S15, the main CPU 11 makes a judgment as to whether or not the photographic scene is to be "portrait". If the live image data have been judged as "portrait" in step S14, the main CPU 11 makes an affirmative decision in step S15 and the operation proceeds to step S16. If, on the other hand, the live image data have not been judged as "portrait" in step S14, a negative judgment is made in step S15 and the operation proceeds to step S17. In step S16, the main CPU 11 selects portrait settings before the operation proceeds to step S27. In more specific terms, it sets the exposure sensitivity, the white balance adjustment coefficient and the like to optimal values for "portrait".

In step S17, the main CPU 11 makes a judgment as to whether or not the live image data should be judged as a "landscape". If the live image data have been judged as "landscape" in step S14, the main CPU 11 makes an affirmative decision in step S17 and the operation proceeds to step S18. If, on the other hand, the live image data have not been judged as with "landscape" in step S14, a negative judgment is made in step S17 and the operation proceeds to step S19. In step S18, the main CPU 11 selects landscape settings before the operation proceeds to step S27. In more specific terms, it sets the exposure sensitivity, the white balance adjustment coefficient and the like to optimal values for "landscape".

In step S19, the main CPU 11 makes a judgment as to whether or not the live image data should be judged as a "night scene". If the live image data have been judged as "night scene" in step S14, the main CPU 11 makes an affirmative decision in step S19 and the operation proceeds to step S20. If, on the other hand, the live image data have not been judged as "night scene" in step S14, a negative judgment is made in step S19 and the operation proceeds to step S21. In step S20, the main CPU 11 selects night scene settings before the operation proceeds to step S27. In more specific terms, it sets the exposure sensitivity, the white balance adjustment coefficient and the like to optimal values for "night scene".

In step S21, the main CPU 11 makes a judgment as to whether or not the live image data should be judged as "sports". If the live image data have been judged as "sports" in step S14, the main CPU 11 makes an affirmative decision in step S21 and the operation proceeds to step S22. If, on the other hand, the live image data have not been judged as "sports" in step S14, a negative judgment is made in step S21 and the operation proceeds to step S23. In step S22, the main CPU 11 selects sports settings before the operation proceeds to step S27. In more specific terms, it sets the exposure sensitivity, the white balance adjustment coefficient and the like to optimal values for "sports".

In step S23, the main CPU 11 makes a judgment as to whether or not the live image data should be judged as "flowers in close-up". If the live image data have been judged as "flowers in close-up" in step S14, the main CPU 11 makes an affirmative decision in step S23 and the operation proceeds to step S24. If, on the other hand, the live image data have not been judged as "flowers in close-up" in step S14, a negative judgment is made in step S23 and the operation proceeds to step S25. In step S24, the main CPU 11 selects "flowers in close-up" settings before the operation proceeds to step S27. In more specific terms, it sets the exposure sensitivity, the white balance adjustment coefficient and the like to optimal values for "flowers in close-up".

In step S25, the main CPU 11 makes a judgment as to whether or not the live image data should be judged as a "mountain landscape". If the live image data have been judged as "mountain landscape" in step S14, the main CPU 11 makes an affirmative judgment in step S25 and the operation proceeds to step S26. If, on the other hand, the live image data have not been judged as "mountain landscape" in step S14, a negative judgment is made in step S25 and the operation proceeds to step S27. After making a negative judgment in step S25, the current settings for the exposure sensitivity, the white balance adjustment coefficient and the like are sustained. In step S26, the main CPU 11 selects the mountain landscape settings before the operation proceeds to step S27. In more specific terms, it sets the exposure sensitivity, the white balance adjustment coefficient and the like to optimal values for "mountain landscape".

In step S27, the main CPU 11 makes a judgment as to whether or not a photographing instruction has been issued. If the shutter release button has been pressed all the way down, the main CPU 11 makes an affirmative decision in step S27 and the operation proceeds to step S28. However, if the shutter release button has not been pressed all the way down, the main CPU 11 makes a negative judgment in step S27 and the operation returns to step S11. In step S28, the main CPU 11 executes main photographing process, and the processing in FIG. 7 ends.

The following advantages are achieved through the first embodiment described above.

(1) Data in a characteristic quantity space where the data are expressed with image characteristic quantities calculated based upon pixel data constituting the image and rangefinding information obtained during a photographing operation, are converted to data in another characteristic quantity space through principal component analysis. Thus, the data are converted to data in a new characteristic quantity space defined by characteristic quantities indicating large variance values and manifesting low levels of correlation among the characteristic quantities.

(2) The new characteristic quantity space into which the data are converted as described in (1) above is a two-dimensional space defined by a first principal component and a second principal component. Compared to the initial seven-dimensional space constituted with the seven characteristic quantities, such a new characteristic quantity space allows the burden of the characteristic quantity space conversion processing to be reduced.

(3) Clustering processing is executed in the new characteristic quantity space into which the initial data are converted as described in (1) above so as to generate data to be used for the photographic scene determination. Through the clustering processing in which the set of data subjected to classification is divided into a plurality of subsets, the set of characteristic quantity data expressing the image is divided into a plurality of subsets so as to obtain a set of characteristic quantity data (a cluster having undergone the clustering processing) corresponding to images with higher similarity. By calculating the mean of the various types of characteristic quantity data within the cluster, barycenter information indicating the barycenter of the characteristic quantity distribution of the images included in each cluster (each photographic scene) can be obtained.

(4) In addition, by calculating the variance/covariance inverse matrices of the various characteristic quantity data distributions within each cluster, spread information indicating the extent to which the characteristic quantity distribution of the images, contained in the particular cluster (photographic scene) spreads can be obtained.

(5) The proper vectors, the barycenter information indicating the barycenter of the characteristic quantity distribution of the images contained in each cluster (each photographic scene) and the corresponding spread information are all stored in advance in the electronic camera 1. Characteristic quantity space conversion is executed by using the proper vectors for a live image obtained before a photographing instruction is issued and photographic scene determination is executed in the new characteristic quantity space into which the data have been converted. Namely, the cluster with characteristic quantities closest to those of the live image (the cluster with the barycenter thereof closest to that of the live image) is determined to be the photographic scene corresponding to the particular live image. Through this process, the photographic scene judgment can be executed with a high level of accuracy.

(6) As it is arranged so that the camera settings corresponding to the judged photographic scene are automatically selected, which reduces the burden placed on the photographer and makes it possible to provide a user-friendly camera.

(7) Through the clustering processing executed in a characteristic quantity space in which data are expressed with characteristic quantities (e.g., Bh, Std, B and Y) calculated based upon the density levels indicated in the pixel data, the photographic scenes having similar contrast densities and colorings can be judged.

(8) With a characteristic quantity (e.g., Bh), indicating the ratio of the characteristic quantity values extracted from a plurality of different areas into which the photographic image plane is divided, the photographic scenes having similar contrasts between the areas can be judged.

(9) Since the clustering processing is executed in a space in which data are expressed with characteristic quantities (e.g., U, M and L) calculated based upon the rangefinding information, the photographic scenes having similar subject distances can be judged.

(10) With characteristic quantities (e.g., U, M and L) calculated based upon the corresponding rangefinding information, extracted from a plurality of different areas into which the photographic image plane is divided, the photographic scenes can be judged using the rangefinding information of a part of the photographic image plane as the characteristic quantities.

(Variation 1)

The closest distribution may be selected based upon Mahalanobis distances. In such a case, assuming that x represents the live image data in FIG. 6, the main CPU 11 selects smaller one between $|x-m1|$ and $|x-m2|/\sigma 2$, which in this case corresponds to "portrait", and judges the photographic scene is "portrait". It is to be noted that $\sigma 1$ represents the variance/covariance corresponding to "portrait" whereas $\sigma 2$ represents the variance/covariance corresponding to "landscape".

(Variation 2)

The number of characteristic quantities defining the new characteristic quantity space into which the initial data are converted as described earlier in (1) is not limited to two, i.e., the first principal component and the second principal component, and the characteristic quantity space can be a three-dimensional space constituted with first through third principal components or a three-dimensional space constituted with first through fourth principal components.

(Variation 3)

It will be obvious that the camera settings selected by the electronic camera 1 upon judging the photographic scene may include the shutter speed and the aperture number setting for the main photographic operation, the auto exposure calculation method setting and the photometering method setting.

(Variation 4)

In the description provided above, the image data based upon which the live image is to be expressed are obtained via the image sensor 22, which is used to obtain image data through the main photographic operation. As an alternative, in case when a colorimetering image sensor is provided separately from a photometring image sensor, the photographic scene judgment may be executed by using an image obtained with the photometring image sensor prior to a photographing instruction. For such a colorimetering image sensor, the one for obtaining color temperature information, which is equipped with R (red), G (green) and B (blue) color filters disposed at the imaging surface thereof, each in correspondence to a specific pixel position so as to provide color information expressed in the RGB colorimetric system, is used.

Second Embodiment

As an alternative to the photographic scene judgment executed in the new characteristic quantity space resulting from the characteristic quantity space conversion, the photographic scene judgment may be executed in the characteristic quantity space which are expressed with the live image characteristic quantities, without executing the characteristic quantity space conversion. In such a case, the characteristic quantity space conversion processing should be skipped when generating the data to be used in the photographic scene judgment, which are stored into the non-volatile memory area 11*a* within the main CPU 11, and when judging the photographic scene.

Namely, the data to be used in the photographic scene judgment should be generated by executing clustering processing for a plurality of sample images in the characteristic quantity space without executing the characteristic quantity space conversion. In this case, too, the barycenter information indicating the barycenter of the characteristic quantity distribution of the images contained in each cluster (each photographic scene) can be obtained by calculating the mean value for the corresponding characteristic quantity data in the cluster.

In addition, by calculating the variance/covariance inverse matrices of each characteristic quantity data distribution within the cluster, spread information indicating the extent to which the characteristic quantity distribution of the images, contained in each cluster (each photographic scene) spreads can be obtained. The characteristic quantity distribution barycenter information and the spread information pertaining to each cluster (each photographic scene) are all stored in advance in the non-volatile memory area 11*a* within the electronic camera 1.

When the photographic scene is judged, the judgment is executed in the characteristic quantity space in which data are expressed with characteristic quantities calculated based upon the live image obtained before a photographing instruction is issued. Namely, the cluster with characteristic quantities closest to those of the live image (the cluster with a barycenter thereof closest to that of the live image) is judged to be the photographic scene corresponding to the live image. Through this process, the photographic scene judgment can be executed with a high level of accuracy.

Through the second embodiment described above, the photographic scene can be judged with a high level of accuracy as in the first embodiment without having to execute the characteristic quantity space conversion and as long as the levels of correlation among characteristic quantities are low.

Third Embodiment

The block diagram in FIG. 1 should also be referred to for the essential components constituting the electronic camera achieved in the third embodiment of the present invention. As in the first embodiment, the electronic camera 1 is controlled by the main CPU 11. It is to be noted, however, that the main CPU does not need to include the nonvolatile memory area 11*a* described in reference to the first embodiment.

The electronic camera 1 executes automatic exposure calculation (AE) by using live image signals and determines a shutter speed and an aperture number that will achieve the optimal exposure. For instance, brightness (luminance) information indicating the brightness of the subject may be detected through an averaged photometering method. In such a case, the value obtained by calculating a mean value of the values indicated by the signals output from the pixels constituting the live image is used as the subject brightness information. Based upon the subject brightness information, the electronic camera 1 determines the optimal shutter speed and aperture number.

When obtaining live image data corresponding to the next frame, the electronic camera 1 controls the length of time over which electric charges are to be stored at the image sensor 22 and, the aperture number, based upon brightness information calculated by using the signal values of the live image in the preceding frame.

The electronic camera 1 in the embodiment has a function of judging the photographic scene by analyzing the live image. After judging the photographic scene, the electronic camera 1 automatically selects a camera setting optimal for photographing the scene having been determined. Such a camera setting include the exposure sensitivity, the white balance adjustment coefficient and a flash unit setting for allowing/disallowing light emission. The exposure sensitivity (ISO sensitivity) is set as an amplification gain at the imaging circuit 23. The white balance adjustment coefficient is set at the image processing circuit 12.

The photographic scenes judged by the electronic camera 1 may be for example the following three types of scenes; “mountain landscape”, “portrait” and “sports”.

((Photographic Scene Judgment Process))

Figure 8:
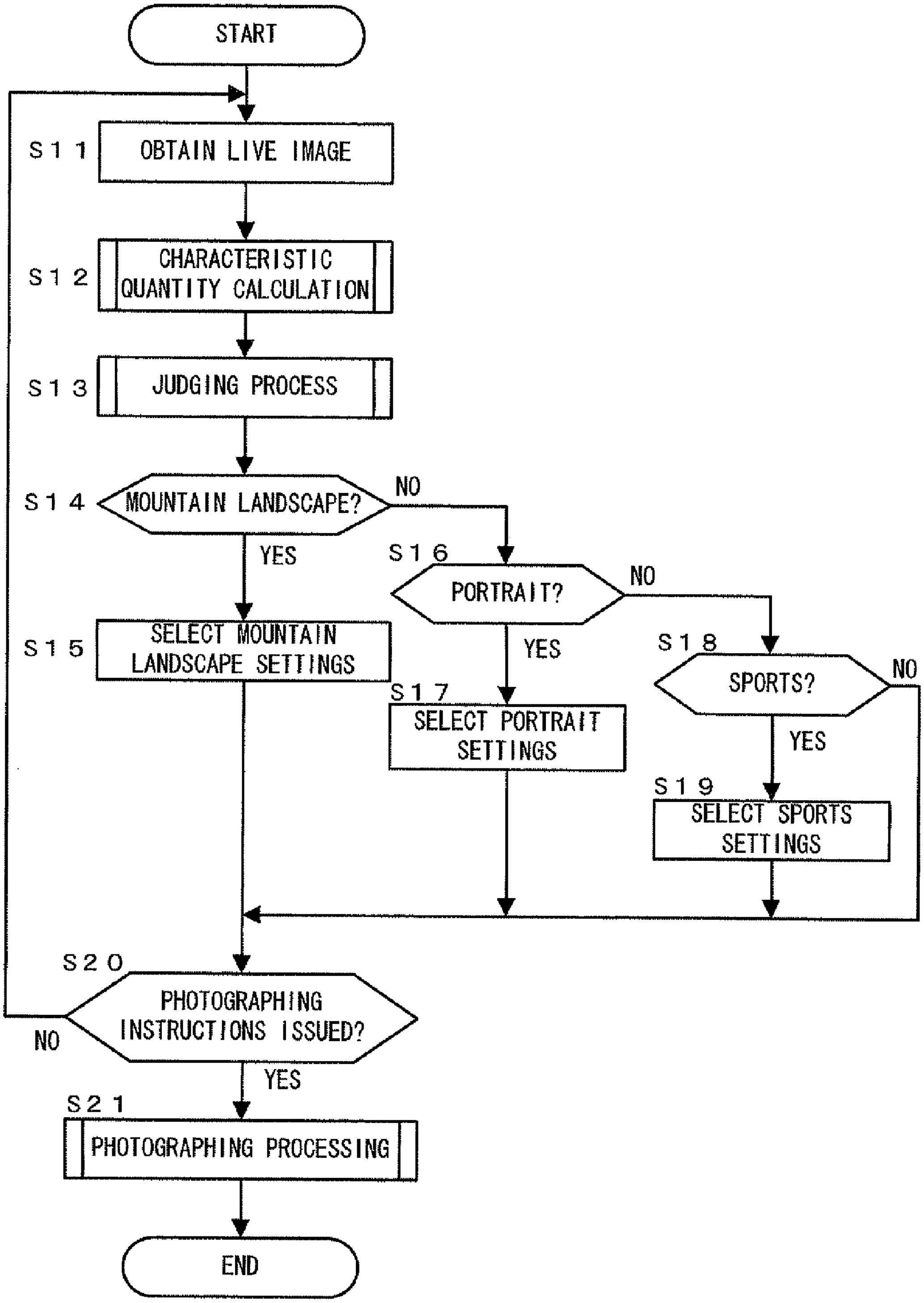
FIG. 8 is a flowchart of photographic scene judgment process

FIG. 8 presents a flowchart of the photographic scene judgment process executed by the main CPU 11 in the electronic camera 1. The program based upon which the processes in FIG. 8 are executed is started up as the electronic camera one is set in a photographing mode. In step S11 in FIG. 8, the main CPU 11 controls the drive of the image sensor 22 and the imaging circuit 23 so as to start acquisition of a live image and then the operation proceeds to step S12. In response, the image processing circuit 12 executes the image processing on the image signals expressing a live image, input thereto from the imaging circuit 23 and the display image generation circuit 15 brings the live image having undergone the image processing up on display at the liquid crystal monitor 16.

In step S12, the main CPU 11 calculates characteristic quantities by using the live image data expanded in the buffer memory 14 and then the operation proceeds to step S13. The characteristic quantity calculation executed in step S12 is to be described in detail later. In step S13, the main CPU 11 executes the judgment process before the operation proceeds to step S14. The judgment process, through which the photographic scene is judged in correspondence to the characteristic quantities, is to be described in detail later.

In step S14, the main CPU 11 makes a judgment as to whether or not the live image data is to be judged as “mountain landscape”. If the live image data have been judged as “mountain landscape” in step S13, the main CPU 11 makes an affirmative judgment in step S14 and the operation proceeds to step S15. If, on the other hand, the live image data have not been judged as “mountain landscape” in step S13, a negative judgment is made in step S14 and the operation proceeds to step S16. In step S15, the main CPU 11 selects mountain landscape settings before the operation proceeds to step S20. In more specific terms, it sets the exposure sensitivity, the white balance adjustment coefficient and the like to optimal values for “mountain landscape”.

In step S16, the main CPU 11 makes a judgment as to whether or not the live image data is to be judged as “portrait”.

If the live image data have been judged as "portrait" in step S13, the main CPU 11 makes an affirmative judgment in step S16 and the operation proceeds to step S17. If, on the other hand, the live image data have not been judged as "portrait" in step S13, a negative judgment is made in step S16 and the operation proceeds to step S18. In step S17, the main CPU 11 selects portrait settings before the operation proceeds to step S20. In more specific terms, it sets the exposure sensitivity, the white balance adjustment coefficient and the like to optimal values for "portrait".

In step S18, the main CPU 11 makes a judgment as to whether or not the live image data is to be judged as "sports". If the live image data have been judged as "sports" in step S13, the main CPU 11 makes an affirmative judgment in step S18 and the operation proceeds to step S19. If, on the other hand, the live image data have not been judged as "sports" in step S13, a negative judgment is made in step S18 and the operation proceeds to step S20. After making a negative judgment in step S18, the current settings for the exposure sensitivity, the white balance adjustment coefficient and the like are kept. In step S19, the main CPU 11 selects sports settings before the operation proceeds to step S20. In more specific terms, it sets the exposure sensitivity, the white balance adjustment coefficient and the like to optimal values for "sports".

In step S20, the main CPU 11 makes a judgment as to whether or not a photographing instruction has been issued. If the shutter release button has been pressed all the way down, the main CPU 11 makes an affirmative judgment in step S20 and the operation proceeds to step S21. However, if the shutter release button has not been pressed all the way down, the main CPU 11 makes a negative judgment in step S20 and the operation returns to step S11. In step S21, the main CPU 11 executes main photographing processing, and the processing in FIG. 8 ends.

(Characteristic Quantity Calculation)

Figure 9:
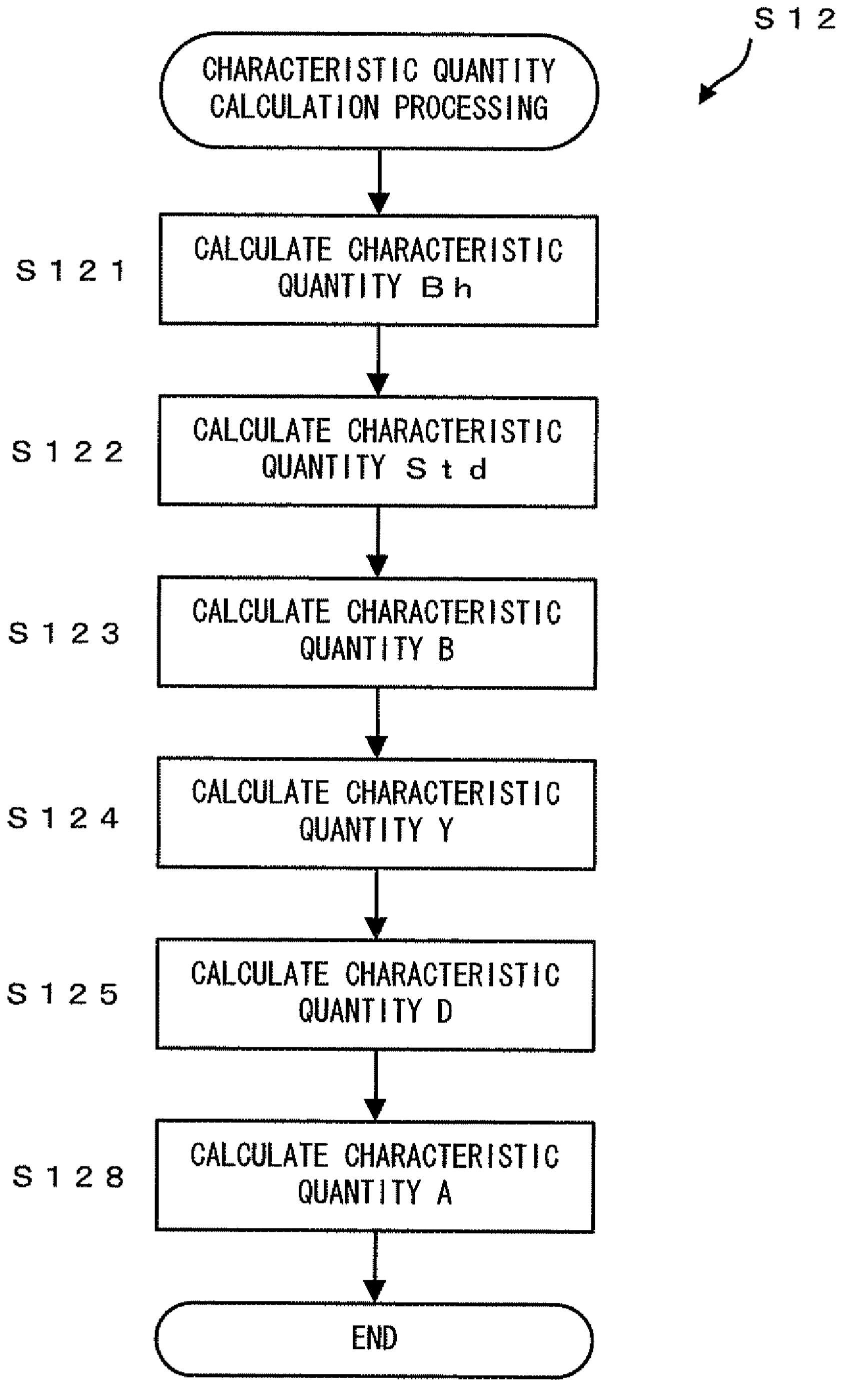
FIG. 9 is a flowchart of characteristic quantity calculation process

The main CPU 11 calculates eight types of characteristic quantities by using the live image data. FIG. 9 presents a flowchart of the characteristic quantities calculation processing. In step S121 in FIG. 9, a characteristic quantity Bh is calculated.

The characteristic quantity 1 (=Bh) is a value obtained by dividing the mean value of the B (blue) component pixel data density values (e.g., values within the range of 0~255 in the case of 8-bit grayscale) indicating the concentration of B (blue) component pixel data present in an upper portion (e.g., the uppermost area among three areas formed by dividing the image along the vertical direction into three substantially equal portions) by the mean value of the B (blue) component pixel data density values indicating the density of the B (blue) component pixel data present in a lower portion of the image (e.g., the lowermost area among the three substantially equal areas into which the image is divided along the vertical direction).

In step S122, a characteristic quantity Std is calculated. The characteristic quantity 2 (=Std) is a standard deviation value indicating the extent of variance manifested by the density values corresponding to the pixel data in the entire image. In step S123, a characteristic quantity B is calculated. The characteristic quantity 3 (=B) is the mean value of the B (blue) component pixel data density values corresponding to the B (blue) component pixel data present in the entire image.

In step S124, a characteristic quantity Y is calculated. The characteristic quantity 4 (=Y) is the mean value of the values indicated in brightness information calculated as expressed in (8) below. Namely, the average of the Y component density values in the pixel data corresponding to all the pixels constituting the image is calculated.

$$Y=0.299\times R+0.587\times G+0.114\times B \quad (8)$$

In step S125, a characteristic quantity D is calculated. The characteristic quantity D is indicated by subject distance information. More specifically, information having been obtained via the focus detection device 18 is used as the characteristic quantity D. The subject distance information indicating the subject distance in the live image is thus obtained.

In step S128, a characteristic quantity A is calculated. The characteristic quantity 8 (=A) indicates the second order difference calculated as expressed in (9) below by using live image data corresponding to a plurality of consecutive frames obtained in time series. In other words, the extent of acceleration (extent of change) manifested by discrete images is calculated.

$$d^2F/dt^2=|F_{i-1}-2\cdot F_i+F_{i+1}| \quad (9)$$

It is to be noted that t and F in the expression above respectively represent the discrete time and a live image, with i indicating the frame number. The calculation is normally executed by using the live image data in the three most recent frames.

The acceleration calculated as expressed in (9) above takes a larger value when the subject is highly dynamic as in a sporting scene and takes a smaller value when the subject is stationary. Through the characteristic quantity calculation processing described above, seven types of characteristic quantities are calculated in correspondence to a frame of live image data and one type of characteristic quantity is calculated based upon the live image data in a plurality of frames.

Photographic Scene Judgment

Figure 10:
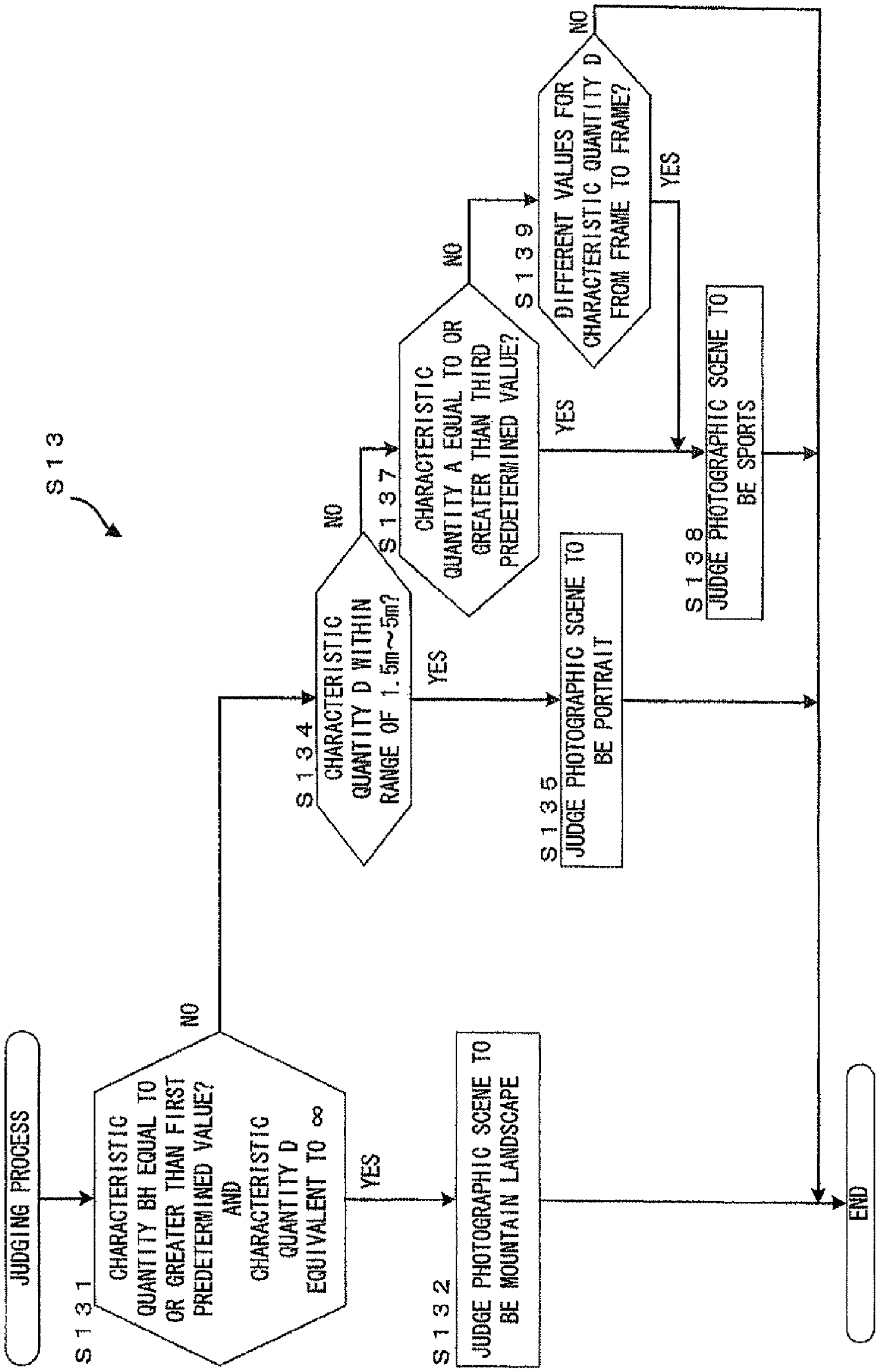
FIG. 10 is a flowchart of photographic scene judgment process
Figure 11:
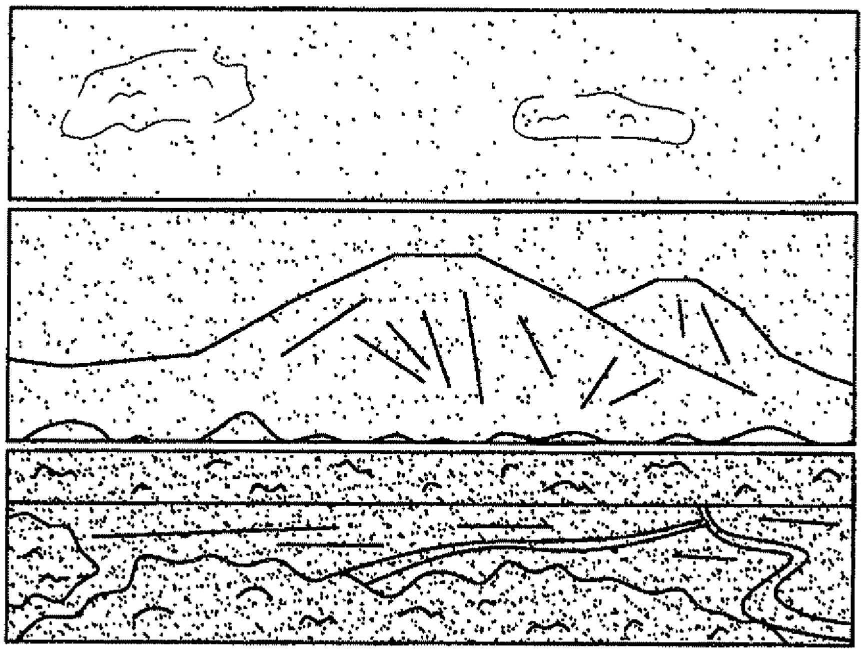
FIG. 11 is an example of an image with the characteristic quantity Bh at 0.67

The main CPU 11 determines the photographic scene based upon the characteristic quantities having been calculated. FIG. 10 presents a flowchart of the photographic scene judgment process. In step S131 in FIG. 10, the main CPU 11 makes a judgment as to whether or not the characteristic quantity Bh is equal to or greater than a first predetermined value and the characteristic quantity D takes a value of infinity. If the characteristic quantity Bh is equal to or greater than, for instance, 0.4 and the characteristic quantity D takes a value of infinity, the main CPU 11 makes an affirmative judgment in step S131 and the operation proceeds to step S132. However, if the characteristic quantity Bh is not equal to or greater than 0.4 or the characteristic quantity D does not takes a value of infinity, the main CPU 11 makes a negative judgment in step S131 and the operation proceeds to step S134. FIG. 11 presents an example of an image with the characteristic quantity Bh thereof assuming a value of 0.67. It is to be noted that 0.67 is a normalized value. If the value indicating the density of B (blue) component pixel data present in the upper portion of the image is high, the likelihood of the image being a mountain landscape is high. In step S132 in FIG. 10, the main CPU 11 judges the image with the photographic scene as "mountain landscape", and ends the processing in FIG. 10.

In step S134, the main CPU 11 makes a judgment as to whether or not the characteristic quantity D is within a range of 1.5 m~5 m. If the characteristic quantity D is within the 1.5 m~5 m range, the main CPU 11 makes an affirmative judgment in step S134 and the operation proceeds to step S135. However, if the characteristic quantity D is not within the 1.5 m~5 m range, the main CPU 11 makes a negative judgment in step S134 and the operation proceeds to step S137. In step S135, the main CPU 11 judges the image with the photographic scene as "portrait", and ends the processing in FIG. 10.

In step S137, the main CPU 11 makes a judgment as to whether or not the characteristic quantity A is equal to or greater than a third predetermined value. The main CPU 11 may make an affirmative judgment in step S137 to proceed to step S138 if, for instance, the ratio of the pixel data with density values thereof exceeding a predetermined value is equal to or greater than 0.3 to all the pixel data constituting the image resulting from the second order difference calculation executed as expressed in (9). If the ratio of such pixel data is less than 0.3, however, the main CPU 11 makes a negative judgment in step S137 and the operation proceeds to step S139.

Figure 12:
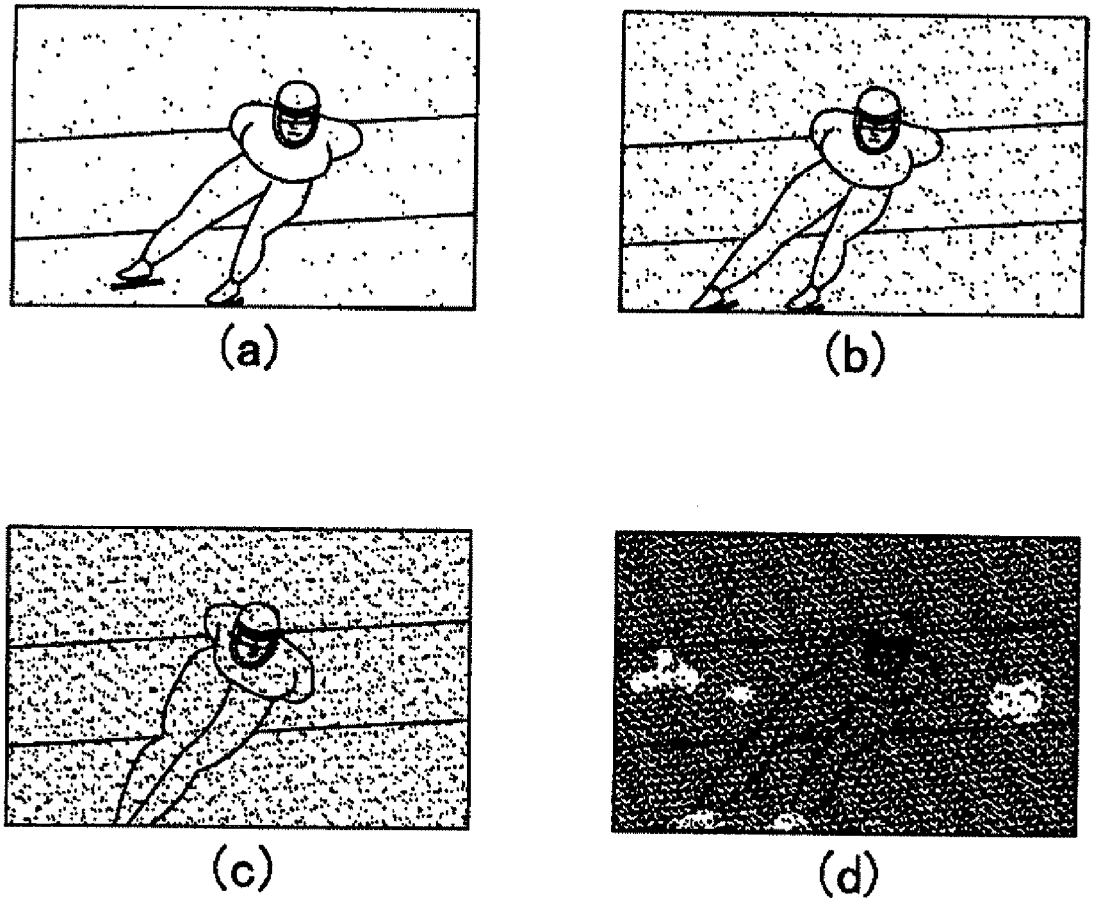
FIG. 12 shows a live image in frame (i−1), a live image in frame (i), a live image in frame (i+1) and an image representing a second order difference, respectively shown in (a), (b), (c) and (d)

FIG. 12 presents an example of results that may be obtained by executing an arithmetic operation as expressed in (9). FIG. 12(*a*) shows the live image in frame (i−1), FIG. 12(*b*) shows the live image in frame (i), FIG. 12(*c*) shows the live image in frame (i+1) and FIG. 12(*d*) shows the second order difference image. FIG. 12(*d*) indicates that the pixel density in an area where there is little or no frame-to-frame change (an area where the subject remains motionless (the subject is not dynamic)) is reduced. If the subject is dynamic, the photographic scene is likely to be "sports". In step S138, the main CPU 11 judges the image with the photographic scene "sports", and ends the processing in FIG. 10.

Figure 13:
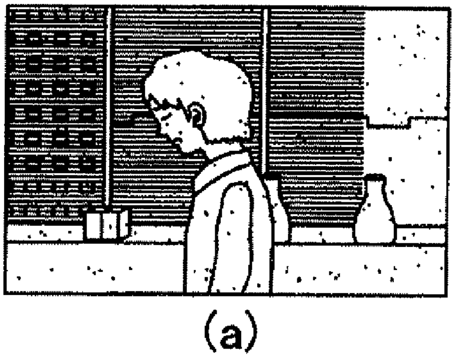
FIG. 13 shows a live image in frame (i−1), a live image in frame (i), a live image in frame (i+1) and a second order difference image, respectively shown in (a), (b), (c) and (d)
Figure 13:
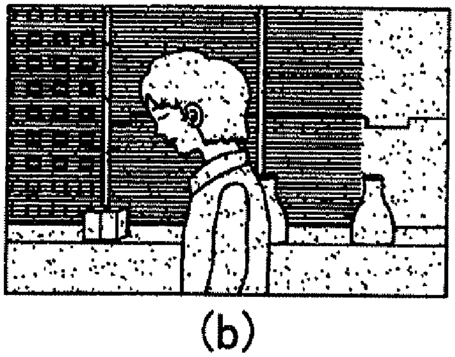
Figure 13:
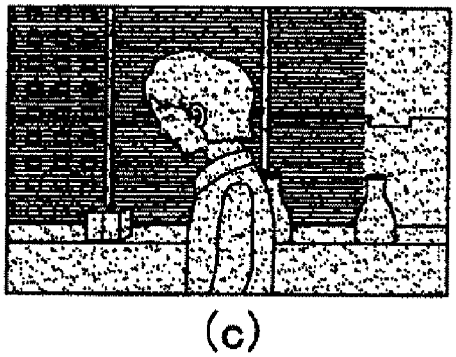
Figure 13:

FIG. 13 presents another example of results that may be obtained by executing an is arithmetic operation as expressed in (9). FIG. 13(*a*) shows the live image in frame (i−1), FIG. 13(*b*) shows the live image in frame (i), FIG. 13(*c*) shows the live image in frame (i+1) and FIG. 13(*d*) shows the second order difference image. FIG. 13(*d*) indicates that when there is little or no frame-to-frame change manifests over the entire image range, the pixel density is reduced over the entire image range.

In step S139 in FIG. 10, the main CPU 11 makes a judgment as to whether or not the characteristic quantity D indicates different values in correspondence to individual frames. If the characteristic quantity D calculated in correspondence to the live image data in the two most recent frames indicates different values, the main CPU 11 makes an affirmative judgment in step S139 and the operation proceeds to step S138. If the subject distances are different between the frames, the photographic scene is highly likely to be "sports". If the values calculated as the characteristic quantity D based upon the live image data in the two most recent frames are equal to each other, the main CPU 11 makes a negative judgment in step S139, and ends the processing in step S10.

The following advantages are achieved through the third embodiment described above.

(1) The photographic scene judgment processing is executed by using the image characteristic quantities calculated based upon the pixel data constituting the image, the rangefinding information detected during the photographic operation and the extent of frame-to-frame pixel data change. As a result, the photographic scene can be judged with a high level of accuracy.

(2) As it is arranged so that the camera settings corresponding to the judged photographic scene are automatically selected, which reduces the burden placed on the photographer and makes it possible to provide a user-friendly camera.

(3) As the characteristic quantities (e.g., Bh, Std, B and Y) based upon the density levels indicated in the pixel data are obtained, it is suitable for judgment of the photographic scenes of which contrast densities and colorings are similar.

(4) As the characteristic quantities are calculated based upon the density levels from a plurality of different areas into which the photographic image plane is divided, it is suitable for judgment of the photographic scenes of which contrast densities and colorings are similar in the predetermined areas.

(5) As the characteristic quantities are calculated for a plurality of different areas into which the photographic image plane is divided, and further a characteristic quantity (e.g., Bh) is defined as the ratio of the characteristic quantities corresponding to the different areas is calculated, it is suitable for judgment of the photographic scenes of which contrast densities are similar between the areas.

(6) As the characteristic quantity D is calculated based upon the rangefinding information, it is suitable for judgment of the photographic scenes of which subject distances are similar.

(7) As the characteristic quantity (e.g. A) is calculated based upon the extent of frame-to-frame density change, it is suitable for judgment of the photographic scenes with movement.

(8) As the extent of change in the values indicated in the rangefinding information between different frames is used for the photographic scene judgment, an image with a dynamic subject can be labeled with a specific type of photographic scene with a high level of accuracy.

(Variation 5)

The flow of the judgment process in FIG. 10 simply represents an example, and the sequence with which the various steps are executed may be switched as needed. For instance, any of the processes of step S131, step S133, step S134, step S137 and step S139 may be executed ahead of or following the others. In addition, the order in which the various steps are executed may be switched in correspondence to the brightness of the subject or depending upon whether or not light emission at a flash unit (not shown) is permitted.

(Variation 6)

While it is arranged so that the photographic scene is judged to be "mountain landscape" if the characteristic quantity Bh is equal to or greater than the first predetermined value (affirmative judgment in step S131), it is also acceptable to carry out the judgment that a photographic scene is "mountain landscape" when another judgment condition is satisfied. More specifically, the photographic scene may be judged to be "mountain landscape" when the characteristic quantity Bh is equal to or greater than the first predetermined value and the extent of frame-to-frame change in the characteristic quantity D is equal to or greater than a predetermined decision-making threshold value.

(Variation 7)

While it is so arranged that the photographic scene is judged to be "sports" if the characteristic quantity A is equal to or greater than the third predetermined value (affirmative judgment in step S137), it is also acceptable to carry out the judgment that a photographic scene is "sports" when another judgment condition is satisfied. More specifically, the photographic scene may be judged to be "sports" when the characteristic quantity A is equal to or greater than the third predetermined value and the extent of frame-to-frame change in the characteristic quantity D is equal to or greater than a predetermined judgment threshold value.

(Variation 8)

When the characteristic quantity A is calculated, it is arranged so that the second order difference (i.e., the extent of change) is calculated as expressed in (9) for the pixel data in the entire range of the image. Instead, the second order difference may be calculated as expressed in (9) in correspondence to pixel data contained in a limited area (part of the image) in which the main subject (e.g., the closest-range subject) is present. As an alternative, the second order difference may be calculated as expressed in (9) in correspondence to pixel data contained in a background area which is different from the main subject.

(Variation 9)

Characteristic quantities (e.g., a characteristic quantity U calculated based upon the rangefinding information corresponding to an upper area of the image plane, a characteristic quantity M calculated based upon the rangefinding information corresponding to a middle area of the image plane and a characteristic quantity L calculated based upon the rangefinding information corresponding to a lower area of the image plane) may be individually obtained based upon the relevant rangefinding information in correspondence to a plurality of different areas into which the photographic image plane is divided. With such characteristic quantities, it is suitable for judgment of a photographic scene in which the rangefinding information of a specific area is similar.

(Variation 10)

The judgment process may be executed based upon additional characteristic quantities Std, B and Y, as well as the characteristic quantities Bh, D and A used in the judgment process described earlier. In such a case, the photographic scene determination process can be executed based upon the density indicated by the pixel data, the ratio of the density levels detected in different areas of the image the rangefinding information obtained for the image, the difference between the values indicated in the rangefinding information obtained in correspondence to different areas of the image, the frame-to-frame pixel data difference and the frame-to-frame rangefinding information difference.

(Variation 11)

It will be obvious that the camera settings selected by the electronic camera 1 after judging the photographic scene may include the shutter speed and the aperture number setting for the main photographic operation, the auto exposure calculation method setting and the photometering method setting.

(Variation 12)

In the description provided above, the image data based upon which the live image is to be expressed are obtained via the image sensor 22, which is used to obtain image data through the main photographic operation. As an alternative, in case when a colorimetering image sensor is provided separately from a photometring image sensor, the photographic scene judgment may be executed by using an image obtained with the photometering image sensor prior to a photographing instruction. For such a colorimetering image sensor, the one for obtaining color temperature information, which is equipped with R (red), G (green) and B (blue) color filters disposed at the imaging surface thereof, each in correspondence to a specific pixel position so as to provide color information expressed in the RGB colorimetric system, is used.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention. In addition, the embodiments and variations thereof described above may be adopted in any conceivable combination.

The disclosure of the following priority application is herein incorporated by reference:

Japanese Patent Application No. 2008-7768 filed Jan. 17, 2008

Japanese Patent Application No. 2008-7769 filed Jan. 17, 2008

The invention claimed is:

1. An electronic camera, comprising:

an image sensor;

a rangefinding unit;

a first arithmetic operation unit that calculates a characteristic quantities based upon pixel density in an image obtained via the image sensor and rangefinding information obtained via the rangefinding unit;

a second arithmetic operation unit that selects a characteristic quantity group with characteristic quantities closest to the characteristic quantities calculated by the first arithmetic operation unit, among a plurality of characteristic quantity groups classified in advance in a space in which the characteristic quantities are expressed;

a third arithmetic operation unit that judges a photographic scene corresponding to the characteristic quantity group selected by the second arithmetic operation unit;

a control unit that selects camera settings in correspondence to the photographic scene having been judged; and a storage unit that stores characteristic quantity variance/covariance information for each of the classified characteristic quantity groups, wherein:

the second arithmetic operation unit selects a characteristic quantity group corresponding to the variance/covariance information indicating a value closest to a characteristic quantity calculated within the space by the first arithmetic operation unit.

2. The electronic camera according to claim 1, further comprising:

the storage unit that stores mean value information indicating a mean value of characteristic quantities in each of the characteristic quantity groups having been classified, wherein:

the second arithmetic unit selects a characteristic quantity group corresponding to the mean value information indicating a value closest to a characteristic quantity calculated within the space by the first arithmetic operation unit.

3. The electronic camera according to claim 2, wherein:

characteristic quantities calculated for a plurality of sample images based upon pixel densities in the plurality of sample images and rangefinding information obtained while photographing the plurality of sample images are classified in advance in a space in which the characteristic quantities are expressed and the mean value information corresponding to each categorized characteristic quantity group is stored in the storage unit.

4. The electronic camera according to claim 1, wherein:

characteristic quantities for a plurality of sample images which are calculated based upon pixel densities of the plurality of sample images and rangefinding information obtained while photographing the plurality of sample images are classified in advance in a space in which the characteristic quantities are expressed, and the variance/covariance information corresponding to each classified characteristic quantity group is stored in the storage unit.

5. The electronic camera according to claim 1, wherein:

the first arithmetic operation unit calculates characteristic quantities based upon pixel density in an image obtained via the image sensor before a photographing instruction is issued and a rangefinding information obtained via the rangefinding unit before the photographing instruction is issued.

6. The electronic camera according to claim 1, wherein: the first arithmetic operation unit calculates a characteristic quantity based upon pixel density over an entire image.

7. The electronic camera according to claim 1, wherein: the first arithmetic operation unit calculates a plurality of characteristic quantities each based upon pixel density in one of various areas into which an image is divided.

8. The electronic camera according to claim 1, wherein: the first arithmetic operation unit calculates a characteristic quantity based upon an extent of change in pixel density over an entire image.

9. The electronic camera according to claim 1, wherein: the first arithmetic operation unit calculates a characteristic quantity based upon an extent of change in pixel density in a specific area of an image.

10. The electronic camera according to claim 1, wherein: the first arithmetic operation unit calculates a characteristic quantity based upon rangefinding information corresponding to a subject.

11. The electronic camera according to claim 1, wherein: the first arithmetic operation unit calculates a characteristic quantity based upon an extent of change in a rangefinding information for the an entire image.

12. The electronic camera according to claim 1, wherein: the first arithmetic operation unit calculates a characteristic quantity based upon an extent of change in a rangefinding information in a specific area of an image.

13. An electronic camera, comprising:

an image sensor;

a rangefinding unit;

a first arithmetic operation unit that calculates a characteristic quantities based upon pixel density in an image obtained via the image sensor and rangefinding information obtained via the rangefinding unit;

a second arithmetic operation unit that selects a characteristic quantity group with characteristic quantities closest to the characteristic quantities calculated by the first arithmetic operation unit, among a plurality of characteristic quantity groups classified in advance in a space in which the characteristic quantities are expressed;

a third arithmetic operation unit that judges a photographic scene corresponding to the characteristic quantity group selected by the second arithmetic operation unit; and a control unit that selects camera settings in correspondence to the photographic scene having been judged, wherein:

the first arithmetic operation unit calculates a plurality of (N) characteristic quantities based upon pixel density of images obtained via the image sensor and rangefinding informations obtained via the rangefinding unit;

the electronic camera further comprises a fourth arithmetic operation unit that executes characteristic quantity space conversion from a space in which the N characteristic quantities are expressed to a space in which the characteristic quantities of number less than N are expressed; and the second arithmetic operation unit selects a characteristic quantity group with characteristic quantities closest to a characteristic quantities resulting from conversion executed by the fourth arithmetic operation unit among a plurality of characteristic quantity groups classified in advance in the space resulting from the characteristic quantity space conversion.

14. The electronic camera according to claim 13, further comprising:

a storage unit that stores mean value information indicating a mean value of characteristic quantities in the characteristic quantity group having been classified, wherein:

the second arithmetic unit selects a characteristic quantity group corresponding to the mean value information indicating a value closest to a characteristic quantity calculated by the fourth arithmetic operation unit within the space resulting from the characteristic quantity space conversion.

15. The electronic camera according to claim 14, wherein: characteristic quantities for a plurality of sample images which are calculated based upon pixel densities in the plurality of sample images and rangefinding information obtained while photographing the plurality of sample images are classified in advance in a space resulting from the characteristic quantity space conversion in which the characteristic quantities are expressed and mean value information corresponding to each categorized characteristic quantity group is stored in the storage unit.

16. The electronic camera according to claim 13, further comprising:

a storage unit that stores characteristic quantity variance/covariance information for each of the classified characteristic quantity groups, wherein:

the second arithmetic operation unit selects a characteristic quantity group corresponding to the variance/covariance information indicating a value closest to a characteristic quantity calculated by the fourth arithmetic operation unit within the space resulting from the characteristic quantity space conversion.

17. The electronic camera according to claim 16, wherein: characteristic quantities for a plurality of sample images which is calculated based upon pixel densities in the plurality of sample images and rangefinding information obtained while photographing the plurality of sample images are classified in advance in the space resulting from the characteristic quantity space conversion in which the characteristic quantities are expressed, and a variance/covariance information corresponding to each of the classified characteristic quantity group is stored in the storage unit.

* * * * *